(12) United States Patent
Singh

(10) Patent No.: US 12,445,487 B2
(45) Date of Patent: Oct. 14, 2025

(54) ANTI-PHISHING BASED ON WRONG FLOW DETECTION

(71) Applicant: Citrix Systems, Inc., Ft. Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 651 days.

(21) Appl. No.: 17/736,664

(22) Filed: May 4, 2022

(65) Prior Publication Data

US 2023/0362193 A1 Nov. 9, 2023

(51) Int. Cl.
*H04L 9/40* (2022.01)
*G06F 21/53* (2013.01)

(52) U.S. Cl.
CPC .......... *H04L 63/1483* (2013.01); *G06F 21/53* (2013.01)

(58) Field of Classification Search
CPC ........ G06F 21/31; G06F 21/55; G06F 21/554; G06F 21/577; H04L 63/083; H04L 63/1441; H04L 63/1483; H04L 63/20
See application file for complete search history.

(56) References Cited

U.S. PATENT DOCUMENTS 11,323,476 B1\* 5/2022 Cao ..................... H04L 63/1425
2022/0329626 A1\* 10/2022 Sambamoorthy ... H04L 63/1483

\* cited by examiner

*Primary Examiner* — Kevin Bechtel

(57) ABSTRACT

A computer system configured to determine safety of a suspected website is provided. The computer system includes a memory and at least one processor coupled to the memory. The at least one processor is configured to receive a request to visit the suspected website; send an incorrect password to the suspected website; receive a reply from the suspected website; and determine, based on the reply to the incorrect password, whether to execute a precautionary operation. The system may proceed with the request responsive to the reply including an error notification, as identified based on one or more of: a Document Object Model (DOM) tag; a re-appearance of a sign-in control; or an Application Programming Interface (API) call. Alternatively, the system may abandon the request responsive to the reply being affirmative, for example including a prompt or input field for a one-time password.

20 Claims, 15 Drawing Sheets

ANTI-PHISHING BASED ON WRONG FLOW DETECTION

BACKGROUND

Cyber security is an issue of great importance, as attacks on computer systems and the users of those systems continue to increase. One of the most prevalent, and often most successful, forms of attack is known as the "phishing attack," in which the user is deceived into willingly providing credentials, such as login passwords, to an attacker. This can occur under various scenarios. For example, the user may be directed to the attacker's phishing website, which may be disguised as a legitimate website, and which asks the user to login using a set of credentials. In some cases, the phishing website may also deceive a user into disclosing a valid temporary or one-time password for two-factor authentication, thereby circumventing an additional layer of security used by legitimate sites.

SUMMARY

In at least one example, a computer system configured to determine safety of a suspected website is provided. The computer system includes a memory and at least one processor coupled to the memory. The at least one processor is configured to receive a request to visit the suspected website. The at least one processor is further configured to send an incorrect password to the suspected website. The at least one processor is further configured to receive a reply from the suspected website. The at least one processor is further configured to determine, based on the reply to the incorrect password, whether to execute a precautionary operation.

At least some examples of the computer system can include one or more of the following features. In the system, to determine whether to execute the precautionary operation can comprise to proceed with the request responsive to the reply including an error notification.

In the system, to determine whether to execute the precautionary operation can further comprise to identify the error notification based on one or more of: a Document Object Model (DOM) tag; a re-appearance of a sign-in control; or an Application Programming Interface (API) call.

In the system, to determine whether to execute the precautionary operation can comprise to abandon the request responsive to the reply being affirmative.

In the system, to abandon the request responsive to the reply being affirmative can comprise to abandon the request responsive to the reply including a prompt or input field for a one-time password.

In the system, to determine whether to execute the precautionary operation can comprise one or more of: to render an alert or warning via a user interface; or to abandon the request. In an example, to render an alert or warning via a user interface may comprise to render the alert or warning via an administrative interface, a visual browser instance, or another application. In an example, to render the alert or warning via an administrative interface may comprise to notify a security operations center or an information technology security administrator.

In the system, to determine whether to execute the precautionary operation can comprise to abandon the request responsive to the reply being redirected to a domain other than a domain of the suspected website.

In the system, to receive the reply from the suspected website can comprise to load the reply in a headless browser session.

In the system, to determine whether to execute the precautionary operation can comprise to determine whether to proceed with the request via a visual browser instance.

In the system, to send an incorrect password to the suspected website can comprise to send a randomly generated password and/or username to the suspected website.

In the system, the computer system can comprise a server computer system, and the at least one processor can be further configured to execute one or more of: a virtual machine; a Virtual Delivery Agent (VDA); a browser; a secure browser; a browser plugin; or a headless browser.

In the system, the computer system can comprise a client computer system, and the at least one processor can be further configured to execute one or more of: a client application; a browser; an embedded browser; a secure browser; a browser plugin; or a headless browser.

In at least one example, a method of determining safety of a suspected website is provided. The method includes acts of receiving a request to visit the suspected website, sending an incorrect password to the suspected website, receiving a reply from the suspected website, and determining, based on the reply to the incorrect password, whether to execute a precautionary operation.

At least some examples of the method can include one or more of the following features. In the method, receiving the reply from the suspected website can comprise loading the reply in a headless browser session and/or within a sandbox environment. Loading the reply in the headless browser session and/or within the sandbox environment can comprise loading, by a separate device or virtual machine, the reply in the headless browser session and/or within the sandbox environment.

At least some examples are directed to a non-transitory computer readable medium storing executable instructions to determine safety of a suspected website. In these examples, the instructions can be encoded to execute any of the acts of the method of determining safety of a suspected website described above or to configure a system to determine safety of a suspected website as described above.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
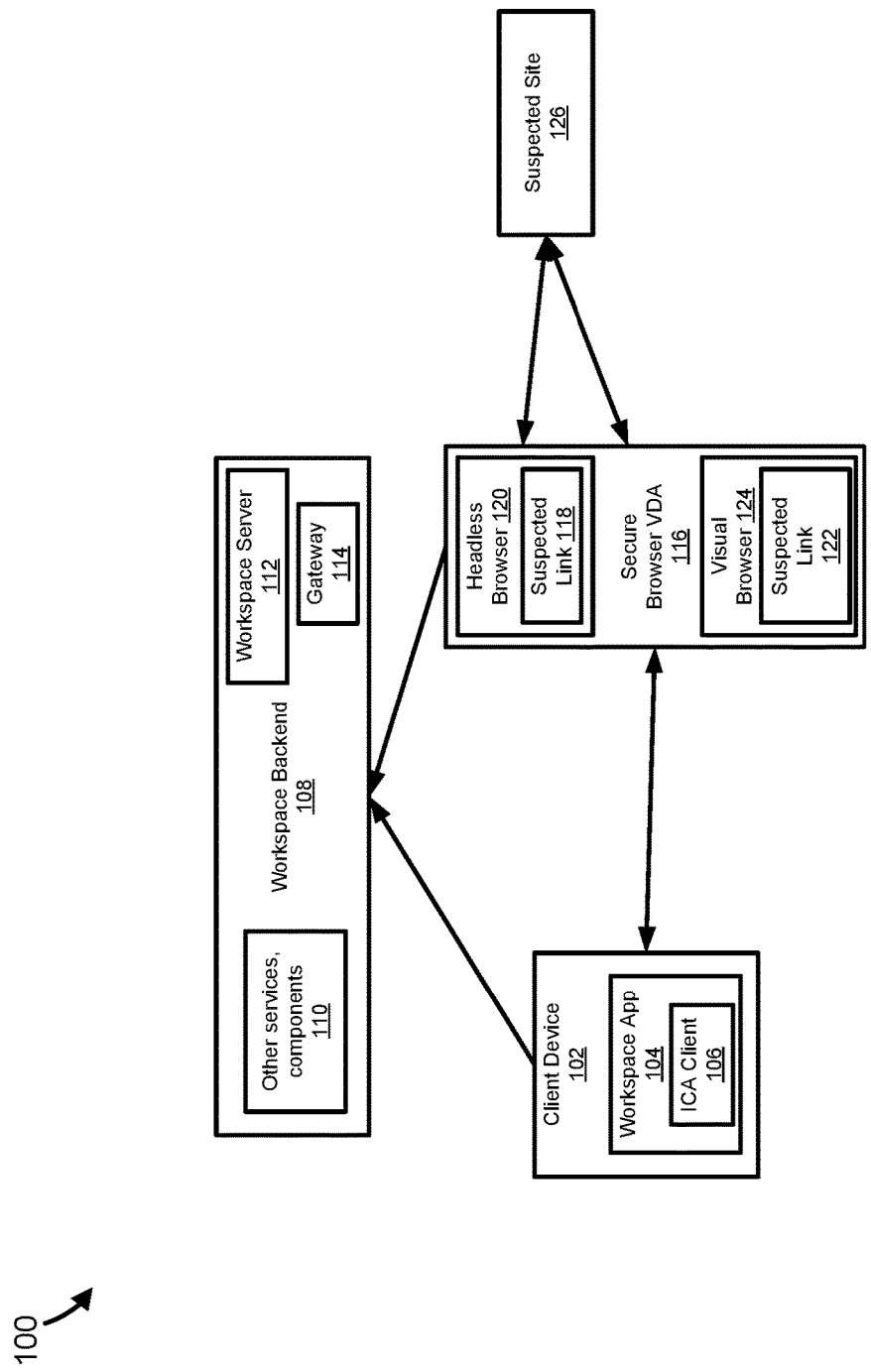
FIG. 1 is a block diagram illustrating a system configured to determine safety of a suspected website, in accordance with an example of the present disclosure.

As noted previously, cyber security is a growing concern as attacks on computer systems and the users of those systems increase. One of the most prevalent, and often most successful, forms of attack is known as the "phishing attack," in which the user is tricked into willingly providing credentials, such as a valid username, password, and/or one-time password for two-factor authentication, to an attacker. This can occur under various scenarios. For example, the user may be directed to a phishing website which is disguised as a legitimate website, and which asks the user to login using a set of credentials, such as the username, password, and/or one-time password (also referred to as an OTP). Because the phishing website appears legitimate, the user may be deceived into entering the valid credentials, which can then be harvested and used by the attacker.

Because it may be difficult for users to recognize phishing websites, user diligence alone may not be a sufficient solution to the problem of phishing. Likewise, maintaining a blacklist of websites known to be dangerous may also be insufficient, as such a list requires updating and may never be complete. Some systems use cues, such as visual aspects of sites, to identify phishing sites. This may also require updates as sites evolve over time, and may also face reliability challenges associated with the need to "fingerprint" sites, such as the challenge of reducing false positive and false negative identifications. The disclosed system and methods can address the need to determine the safety of suspicious websites without needing to identify particular sites.

The use of two-factor authentication by legitimate websites, for example requiring a temporary or one-time password, has proliferated in order to provide additional layers of security against phishing or other attacks. In two-factor authentication (also referred to as TFA), a second method of identifying the user is used. For example, once a user signs into a legitimate website, the site may send a temporary or one-time password to the user via the user's email, secondary email, telephone call, simple messaging service (SMS) via the user's mobile phone, or another contact method, or the user may obtain the one-time password from an authentication app (also referred to as an authenticator app) or a list of temporary passcodes. However, some phishing techniques can deceive a user into disclosing a valid one-time password, thereby circumventing the additional security layer offered by two-factor authentication.

To address these and other problems, and as summarized above, various examples described herein are directed to systems and methods for determining the safety of suspected websites. In some examples, the disclosed techniques are implemented, at least in part, by a web browser plug-in or extension. In particular, in some examples, the disclosed system can open a suspected site and/or link in two instances. The system can present a visual instance to the user where a user can interact, for example by entering user credentials or other information in input fields. A user may require a few seconds to enter credentials in the visual instance, and before the user completes the login, the disclosed method may obtain a result from carrying out the disclosed phishing test in the hidden instance. At the same time, a hidden instance of the site may be loaded, such as an instance in a headless browser session. In this hidden instance, the system can enter a fake or deliberately incorrect username and/or password and perform a login. A successful or affirmative reply to an invalid credential (e.g., an invalid username and/or password) may confirm the suspected site as a phishing site. In this case, the system may perform an action, such as abandoning the user's request to load the site, notifying the user in the visual browser instance, and/or terminating the visual browser instance.

Accordingly, the disclosed system and methods can address the need to evaluate the safety of suspicious websites based directly on the behavior of the sites, and without needing to learn or store information such as the user's valid credentials, site-specific cues, or safety ratings of particular sites. The disclosed system and methods may face fewer reliability challenges than other methods of phishing detection, such as false positive and false negative classifications associated with fingerprinting sites. Moreover, the disclosed system can detect security flaws that other approaches to phishing detection may miss, including detecting attacks that seek to circumvent two-factor authentication.

The systems and processes described herein for determining safety of suspected websites can be implemented within a variety of computing resources. For instance, in some examples, the systems and processes for determining safety of suspected websites are implemented within a browser and/or a browser extension. Moreover, in some examples, the systems and processes are implemented within a virtualization infrastructure, such as the HDX™ virtualization infrastructure commercially available from Citrix Systems of Fort Lauderdale, Florida, in the United States. In these examples, the determining safety of suspected websites systems and processes can be implemented within a workspace client application (also referred to as a digital workspace application), such as the Citrix Workspace™ application; a browser embedded within the workspace client application; a secure browser service, such as the Citrix Secure Browser™ service; a gateway appliance, such as the Citrix Application Delivery Controller™ (ADC); a virtualization agent, and/or other computing resources.

FIG. 1 is a block diagram illustrating a system 100 configured to determine safety of a suspected website, in accordance with an example of the present disclosure. In this example, a client device 102 can execute a workspace application 104, which can host an Independent Computing Architecture (ICA) client 106. For example, the client device 102 and workspace application 104 can correspond, respectively, to the endpoint 706 and the digital workspace 710 of the example of FIG. 7 below.

In an example, a user may direct a secure browser executing within the ICA client 106 and/or the workspace application 104, or a secure browser service, to open a suspicious Uniform Resource Locator (URL) address or link. The workspace application 104 and/or the client device 102 may send a request to the workspace backend 108 to open the link. The workspace backend 108 can include the workspace server 112, which may correspond to the digital workspace server 702 of FIG. 7, the gateway 114, and other services and components 110.

The workspace backend 108 and/or the workspace server 112 can evaluate the request, for example by looking up a categorization and/or reputation of the link and/or its domain. Based on this evaluation, the workspace backend 108 and/or the workspace server 112 may permit the link to be opened in a secure remote browser, for example via the secure browser Virtual Delivery Agent (VDA) 116. Accordingly, the workspace backend 108 and/or the workspace server 112 can generate and send an ICA file to the client 102. The ICA client and/or the workspace application 104 can connect to the session with the secure browser VDA 116.

The VDA 116 can open the suspicious link in two instances, for example it can open the link 118 in a headless browser session 120, and open the link 122 in a visual browser session 124 to be rendered for the user. In this example, the headless browser session 120 executes within the VDA 116, but in various examples, it may execute within a virtual machine or a client device, as in the examples of FIGS. 8-10 below, or within a separate computing device. The VDA 116 can use the headless browser session 120 to perform an incorrect or fake login, i.e. to send incorrect credentials to the suspected site 126. For example, the VDA 116 may use the headless browser session 120 to send both an incorrect username and password. In another example, if the suspected site 126 has already acquired a username of the user (e.g., in a spearphishing or target attack), the VDA 116 may use the headless browser session 120 to send an incorrect password. The suspected site 126 can receive the incorrect credentials, and can evaluate them, as described in the examples of FIGS. 2A-2C below.

The suspected site 126 can then send a reply to the incorrect login to the VDA 116 and/or the headless secure browser session 120. The VDA 116 and/or the headless secure browser session 120 can receive the reply from the suspected site 126.

In some examples, the VDA 116 and/or headless secure browser session 120 can detect redirection to a different domain as an indication of phishing. For example, the suspected site 126 may redirect to a home page of the legitimate site after receiving the credentials, or may attempt to sign into the legitimate site as the user and redirect to the user's personal page within the legitimate site. The VDA 116 and/or headless secure browser session 120 can detect this redirection, for example by comparing a domain of the suspected site to the redirected domain, and can use the redirection as an indication of phishing. Redirection is described in the examples of FIGS. 2D and 4A-4C below.

If the VDA 116 and/or headless secure browser session 120 receive an error reply to the incorrect or fake login, the VDA 116 may permit the user's request to visit the suspicious website via the visual instance of the browser. If the incorrect or fake login succeeds or the VDA 116 detects suspicious domain redirection, the VDA 116 can abandon the user's request to visit the suspicious website via the visual instance. The VDA 116 can also perform an action, such as terminating the visual instance of the browser, rendering a notification for the user, or the like. The decision to permit or abandon the user request to view the site will be described in greater detail in the examples of FIGS. 5-6 below. Accordingly, the disclosed system and methods can reliably evaluate the safety of suspicious websites based directly on the sites' behavior, without needing to learn or store site-specific information, and can moreover detect attacks seeking to circumvent two-factor authentication, as described herein below.

Figure 2A:
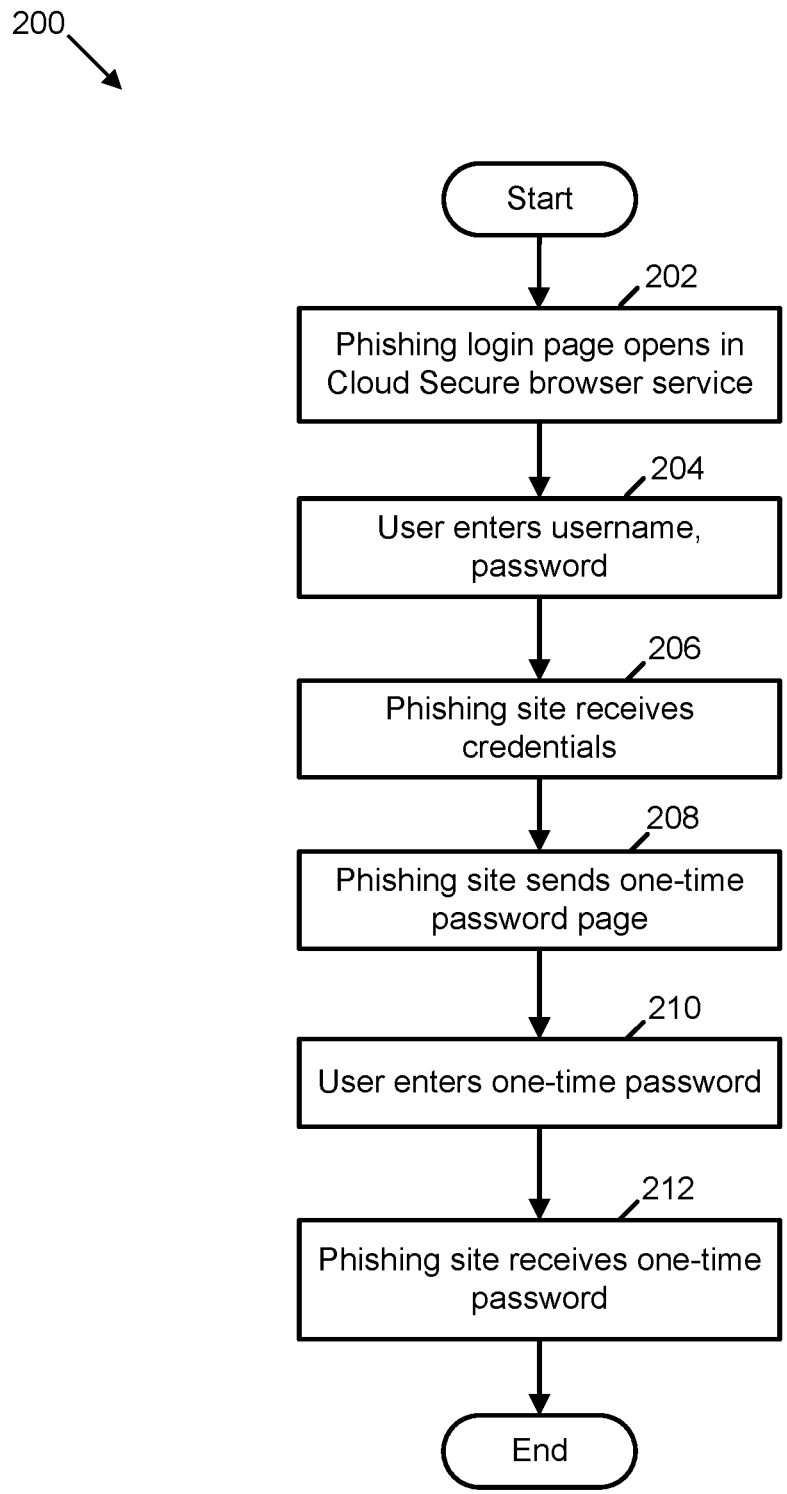
FIG. 2A illustrates an example flow of a phishing website simulating a legitimate site in order to harvest a user's credentials.

FIG. 2A illustrates an example flow 200 of a phishing website simulating a legitimate site in order to harvest a user's credentials. As described above, in a phishing attack, the user may visit a website that appears legitimate and may be deceived into entering credentials, such as a valid username, password, and/or one-time password on an input form of the website.

The usage of two-factor authentication, such as requiring a temporary or one-time password, has proliferated in order to provide an additional layer of security against phishing or other attacks. In two-factor authentication, a second method of identifying the user is used. For example, once a user signs into a legitimate website, the site may send a temporary or one-time password to the user via the user's email, secondary email, mobile phone, or other contact method, or the user may obtain the one-time password from an authentication app or a list of temporary passcodes. The user must then enter the temporary or one-time password in order to complete authentication and sign into the site. In order to steal the one-time password, an attacker would need access to the user's email, secondary email, mobile phone, authentication app token, or other contact method. However, as this example illustrates, some phishing techniques can fool a user into disclosing a valid one-time password, thereby circumventing the additional security layer offered by two-factor authentication.

In this example, a phishing login page may first open 202 in a browser, for example a cloud secure browser service. In some cases, the phishing site may pose as a specific legitimate site. For example, the phishing site may pose as a site familiar to the user and on which the user has an account. For example, the phishing site may deliberately be designed to appear similar to the legitimate site, so as to deceive the user. The phishing site may also have an address similar to the address of the legitimate site, or a realistic-looking phishing email or other message may present a link to the phishing site in lieu of a link to the legitimate site, in order to deceive the user.

Next, a user may enter 204 login credentials, such as a username and password. When the user views the phishing login page, the user may be deceived into entering valid credentials. In particular, the user may be deceived into trying to log in with credentials pertaining to a legitimate site, for example because the phishing site is deliberately designed to resemble that same legitimate site.

In some cases, the phishing site may already have username input, for example in spearphishing or target attacks. In such cases, the user may be deceived into entering 204 a password, such as a valid password.

Next, the phishing site can receive 206 the user's credentials. The phishing site may harvest these credentials. For example, the phishing site may record the credentials for sale on the dark web, and/or to log into the user's account. Alternatively or additionally, a human attacker or an automated bot may immediately try to log into the user's account using the credentials.

For example, the phishing site may immediately try to log into the user's account in order to prompt two-factor authentication by the legitimate site. In the example of FIG. 2A, a one-time password is also needed in order to log into the legitimate site. Because the user has actually entered login credentials to the phishing site rather than the legitimate site, the legitimate site's two-factor authentication process may not have been initiated. That is, the legitimate site may not have generated or sent the user a temporary password. Moreover, the phishing site may lack the user's contact information and/or lack access to the user's secondary contact methods, and therefore may be unable to steal a one-time password directly. Accordingly, the phishing site may immediately pass the user's credentials to the legitimate site, thereby initiating two-factor authentication.

In another example, it may not be necessary for the phishing site to pass credentials to the legitimate site to initiate two-factor authentication. For example, the user may receive the one-time password via an authentication app, such as on the user's mobile device. In such cases, the one-time password may be persistently available via the app, and be refreshed periodically, and thus may not be sent as a notification, e.g. by telephone, SMS, or email. In this example, the phishing site may not immediately pass the user's credentials to the legitimate site. Nevertheless, the phishing site may still display a two-factor authentication page, and the user may be deceived into entering the one-time password from the authentication app.

Next, the phishing site may send 208 a one-time password page to the user's browser in an attempt to harvest the one-time password. For example, the phishing site may receive a one-time password page from the legitimate site after sending the user's login credentials to the legitimate site. At the same time the legitimate site sends the one-time password page to the phishing site, it may also send the one-time password to the user's secondary contact method, e.g. the user's email or mobile phone, or the user can obtain the one-time password from an authentication app. In an example, the phishing site may also forward the user a page appearing similar to a legitimate one-time password page, in order to deceive the user.

Next, the user may enter 210 the one-time password in the page sent by the phishing site. The user may receive the one-time password sent by the legitimate site, or obtain the one-time password from an authentication app, and may enter 210 it in the page from the phishing site.

Next, the phishing site may receive 212 the one-time password from the user. At this point, the phishing site may have a complete set of user credentials, including the user's valid username and password, as well as the valid one-time password. The phishing site may harvest the one-time password. Because the one-time password may be valid only for a limited time or only within the same login initiated by the phishing site, the phishing site may immediately use it to complete the previously-initiated login to the legitimate site.

The phishing process 200 may then end. Process 200 may be used to successfully deceive a user and harvest the user's login credentials and one-time password. Note that the success of the process 200 may depend, in part, on the process appearing legitimate from the user's point of view. However, FIGS. 2B and 2C below illustrate differences in behavior between a phishing and legitimate site which can be used to detect phishing, in accordance with examples of the present disclosure.

Figure 2B:
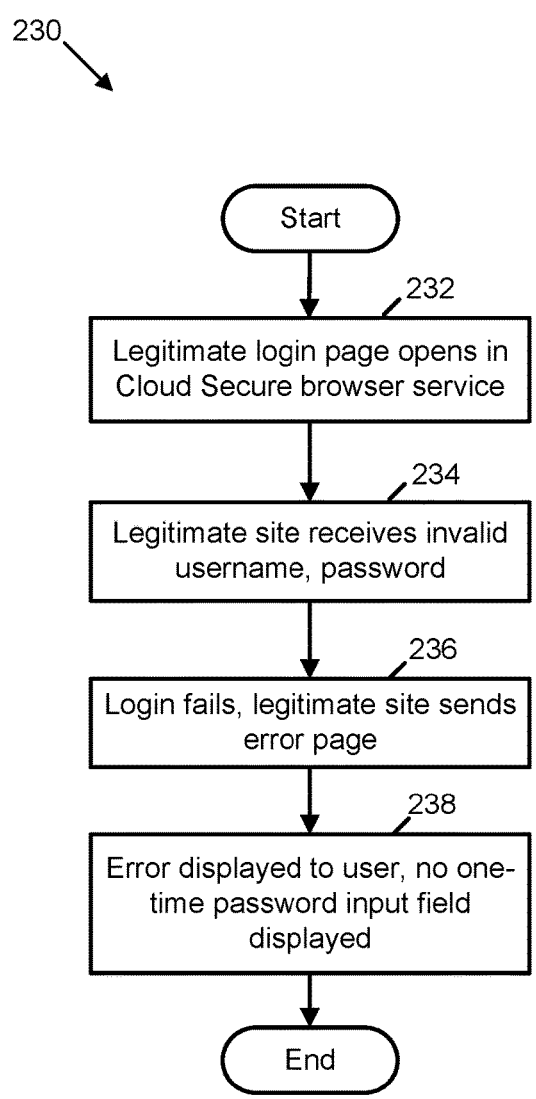
FIG. 2B illustrates an example flow of the reply of a legitimate website to an invalid user credential, in accordance with an example of the present disclosure.

FIG. 2B illustrates an example flow 230 of the reply of a legitimate website to an invalid user credential, in accordance with an example of the present disclosure.

In this example, a legitimate login page may first open 232 in a browser, for example a cloud secure browser service.

Next, the legitimate site may receive 234 an invalid credential, such as an invalid username and/or password. For example, the legitimate site may receive the invalid credential from a user. Alternatively, in some examples, the legitimate site may receive the invalid credential from the disclosed system.

Next, the legitimate site can check or authenticate the received credential, and can determine that the credential is invalid. As a result, the login may fail 236, and the legitimate site may send an error page in reply.

Next, the browser or client device may render 238 the error page sent by the legitimate site for the user. The error page may include an error notification and/or may include a request to repeat the login. Because the legitimate site can determine that the credential is invalid, the legitimate site may not advance to a second stage of login, such as two-factor authentication. In particular, the error page may not include a one-time password input field, even if it does include standard username and/or password input fields, as in the example of FIG. 3A below.

The legitimate reply to an invalid credential process 230 may then end.

Figure 2C:
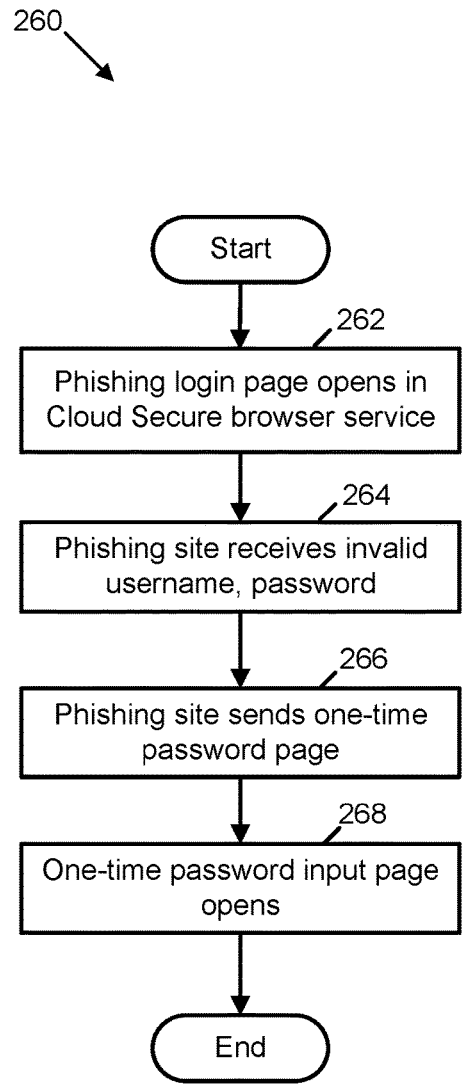
FIG. 2C illustrates an example flow of the reply of a phishing website to an invalid user credential, in accordance with an example of the present disclosure.

FIG. 2C illustrates an example flow of the reply 260 of a phishing website to an invalid user credential, in accordance with an example of the present disclosure.

In this example, a phishing login page may first open 262 in a browser, for example a cloud secure browser service.

Next, the phishing site may receive 264 an invalid credential, such as an invalid username and/or password. For example, the legitimate site may receive the invalid credential from a user. Alternatively, in some examples, the legitimate site may receive the invalid credential from the disclosed system.

Next, the phishing site may send 266 a one-time password page to the user's browser. The step 266 can correspond to the step 208 of the method 200 for harvesting valid credentials by a phishing website in the example of FIG. 2A above. In particular, many phishing websites may not apply any techniques or heuristics to ensure the validity of the credentials being harvested. For example, many phishing websites may simply send the one-time password page indiscriminately after receiving the user's credentials.

Note that the step 266 differs from the legitimate behavior 230 of the example of FIG. 2B. In particular, a legitimate website would not send a request for a one-time password in reply to an incorrect login. Furthermore, the step 266 differs from legitimate behavior in a way that can be detected externally, e.g. the disclosed system can use this difference in behavior as an indication of phishing, as described herein below.

Finally, the one-time password input page may open 268 in the user's browser. Note that the step 268 also differs from the legitimate behavior 230 of the example of FIG. 2B. Furthermore, the step 268 also differs from the process 230 in a way that can be detected externally. For example, the disclosed workspace application, workspace server, and/or cloud secure browser service can detect this difference, for instance, simply by observing the page received from the phishing site. In some examples, the disclosed system can use this detected behavior difference as an indication of phishing.

The phishing reply to an invalid credential process 260 may then end.

Figure 2D:
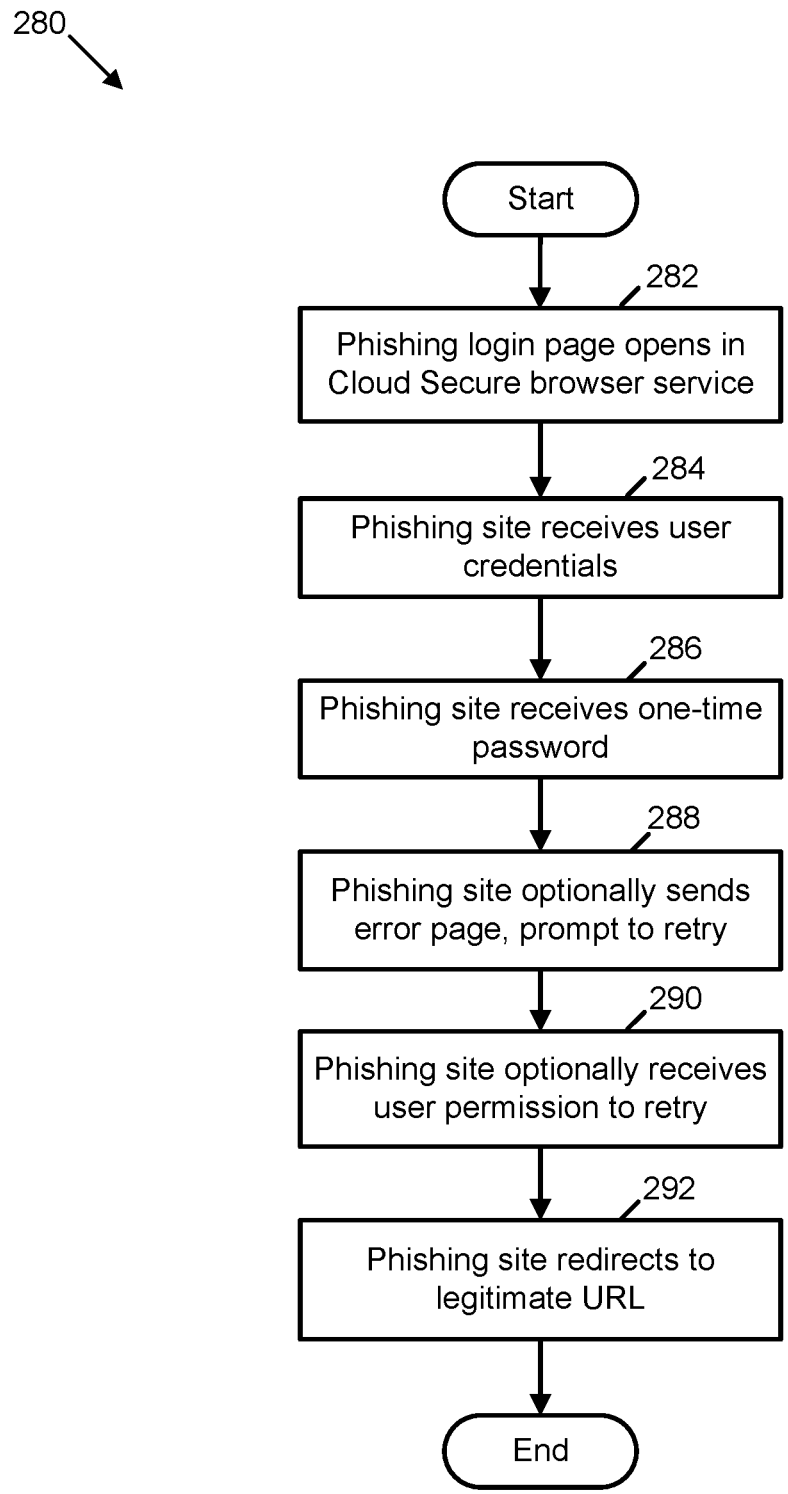
FIG. 2D illustrates an example flow of redirection from a phishing website to a legitimate website, which can be used to identify phishing, in accordance with an example of the present disclosure.

FIG. 2D illustrates an example flow 280 of redirection from a phishing website to a legitimate website, which can be used to identify phishing, in accordance with an example of the present disclosure. In some examples, the phishing site may redirect to a legitimate site after harvesting the user's credentials, thereby continuing to deceive the user.

In this example, a phishing login page may first open 282 in a browser, for example a cloud secure browser service. As in the example of FIG. 2A, the phishing site may pose as a specific legitimate site, for example, it may be disguised to appear similar to the legitimate site, so as to deceive the user.

Next, the phishing site can receive 284 the user's credentials, and may harvest these credentials.

Next, the phishing site can receive 286 a one-time password from the user, and may also harvest the one-time password.

Next, the phishing site can optionally send 288 an error notification page to the user. For example, the error notification page may state that a network error has occurred, or may state that an incorrect login has occurred, e.g. because the credentials originally entered by the user are incorrect. In an example, the error notification page may prompt the user to retry the login. For example, the error notification page may present a button or other prompt for retrying the login.

Next, the phishing site can optionally receive 290 user permission to retry the login. For example, if the error notification page has prompted the user to retry, the phishing site may receive 290 confirmation that the user has clicked a button or other prompt to permit retrying the login.

Finally, the phishing site may redirect 292 to the URL of a legitimate site, for example a specific legitimate site that the phishing site is posing as. For example, the phishing site may immediately use the harvested credentials to log into the legitimate site, and may then redirect the user's browser to the legitimate site. In another example, after receiving the user's credentials, the phishing site may redirect to the home page of the legitimate site. In such a case, the user may be presented with a legitimate login page for the legitimate site, and may be deceived into thinking that an error has occurred, and accordingly may reenter the user's credentials.

Redirecting 292 to the legitimate site may help to deceive the user, since the phishing server only hosts the user's experience briefly during the sign-in process. However, the disclosed system can detect this redirection, for example, by inspecting URLs and determining a change in domain and/or URL after redirection 292. Redirection 292 to a legitimate site is described in greater detail in the examples of FIGS. 4A-4C below.

The redirection from a phishing website to a legitimate website process 280 may then end.

Figures 3A, 3B:
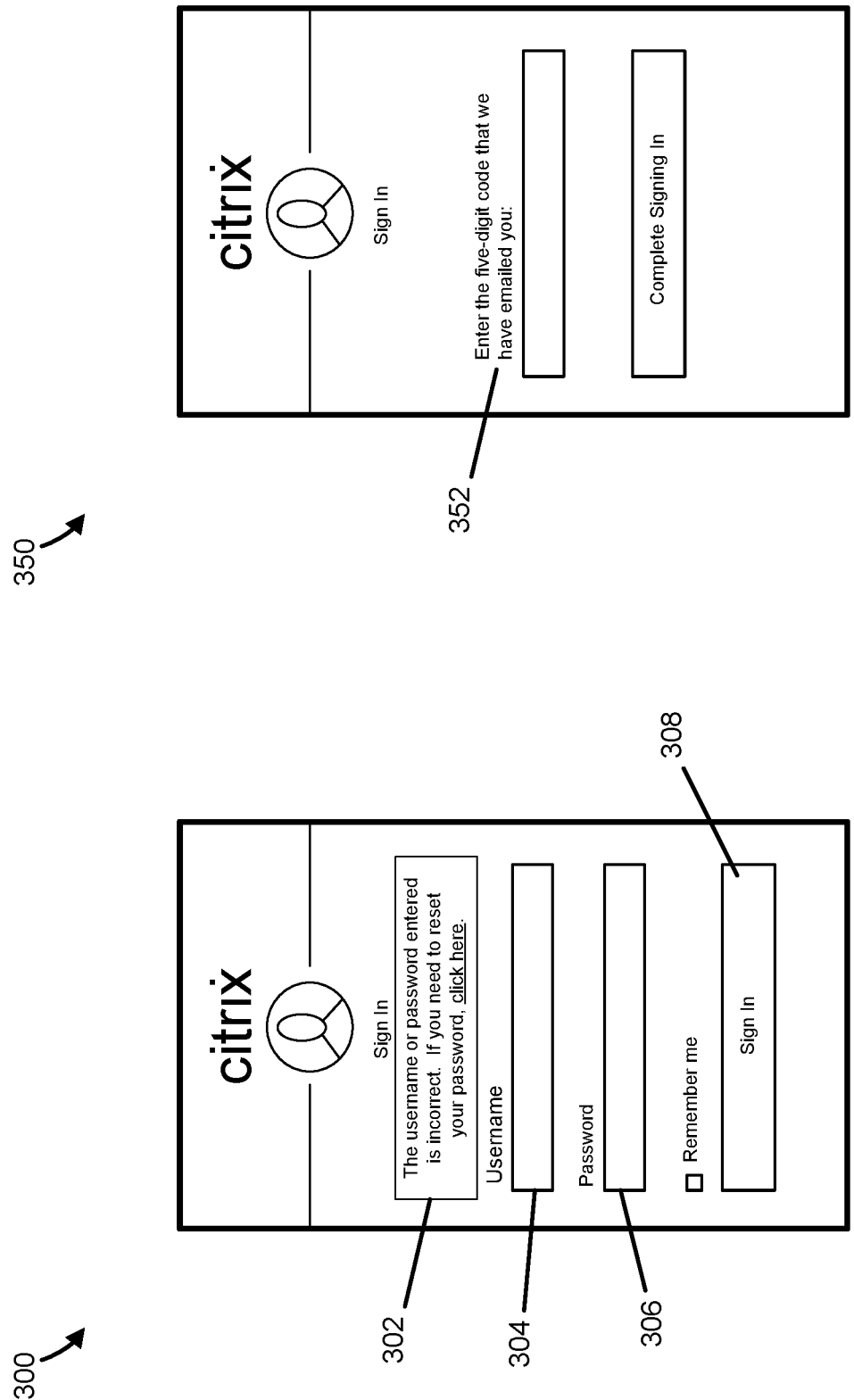
FIG. 3A illustrates an example reply of a legitimate website to an invalid user credential, in accordance with an example of the present disclosure.
FIG. 3B illustrates an example reply of a phishing website to an invalid user credential, in accordance with an example of the present disclosure.

FIG. 3A illustrates an example reply 300 of a legitimate website to an invalid user credential, in accordance with an example of the present disclosure. In this example, a legitimate website replies to an invalid user credential received from a user or from the disclosed system, as in the example of FIG. 2B above. Because the user credential was invalid, the login may fail, and the legitimate site may send the error page 300 in reply.

For example, the reply 300 includes an error message 302. In some examples, the disclosed system can detect such an error message, for example by inspecting the page 300 and/or its source. For example, the system may inspect HTML label names or text fields to identify the text of the message 302. Alternatively, the disclosed system can use optical character recognition (OCR) to identify the text. Further, the system may inspect the text of the message 302 to determine that it conveys an error message, for example by identifying keywords such as "incorrect," "username," and "password," and/or by applying machine learning to classify the message 302. In one example, the system may weight various cues, such as the presence of the keyword "incorrect," in order to determine that the message 302 conveys a login error.

The disclosed system may also determine that the reply 300 denotes an unsuccessful login by identifying other elements. In this example, the reappearance of a username entry field 304, a password entry field 306, and/or a sign-in button 308 within the website's reply 300 are all indications that the user's initial login was not accepted by the legitimate website. For example, the system may inspect the source of the page 300, and may use HTML "<input>" tags, "type=password" tags, label names such as "username" and/or "password" on the input fields, and the like to identify input fields such as the username input field 304 and password input field 306. Likewise, the system can inspect the page 300 source to identify the sign-in button 308.

In some examples, the system may weight, and/or apply a learned statistical model to, various cues, in order to determine that the reply 300 denotes an unsuccessful user login. For example, these cues may include the presence of the error message 302, the username input field 304, the password input field 306, the sign-in button 308, and/or other cues, and are not limited by the present disclosure. In some examples, the cues may also include a successful reply and/or a request for two-factor authentication, as illustrated in FIG. 3B.

FIG. 3B illustrates an example reply 350 of a phishing website to an invalid user credential, in accordance with an example of the present disclosure. In this example, a phishing website replies to a possibly invalid user credential received from a user or from the disclosed system, as in the examples of FIGS. 2A and 2B above. Although the user credential may possibly be invalid, the phishing website may lack the information to evaluate the credential's validity, and therefore may indiscriminately send an affirmative or successful reply 350, as in the example of FIG. 2B above. The disclosed system may therefore use the difference between the legitimate site's error reply 300 and the phishing site's affirmative reply 350 in order to detect phishing.

In this example, the reply 350 includes a request 352 for two-factor authentication, such as a one-time password. In some examples, the disclosed system can detect such a request, for example by inspecting the page 350 and/or its source. For example, the system may inspect HTML label names or text fields to identify the text of the message 352. Alternatively, the disclosed system can use optical character recognition (OCR) to identify the text. In addition, the system may inspect the text of the message 352 to determine that it conveys a request for two-factor authentication, for example by identifying keywords such as "enter," "code," and "emailed," and/or by applying machine learning to classify the message 352. In various examples, other keywords indicating a request for two-factor authentication may include "token," "verify," "verification," "validation," "authentication," "authenticator," "one-time," "one-time password," "OTP," "temporary;" "expire," "mobile app," and the like.

The system may use a combination of multiple cues in order to increase the confidence level of its determination that the reply 350 is affirmative. In one example, the system may weight various cues, such as the presence of the keyword "emailed," in order to determine that the message 352 conveys a request for two-factor authentication.

Likewise, the system may use a combination of multiple cues in order to increase the confidence level of its determination whether the site is a legitimate site or a phishing site. For example, the system may use a combination of the presence or absence of an error message, as in FIG. 3A, and the presence or absence of a request for two-factor authentication, as in FIG. 3B, to determine whether the site is legitimate. In some cases, the system may use a learned model. Determining whether the site is legitimate based on multiple cues is described in greater detail in the example of FIG. 6 below.

Figure 4A:
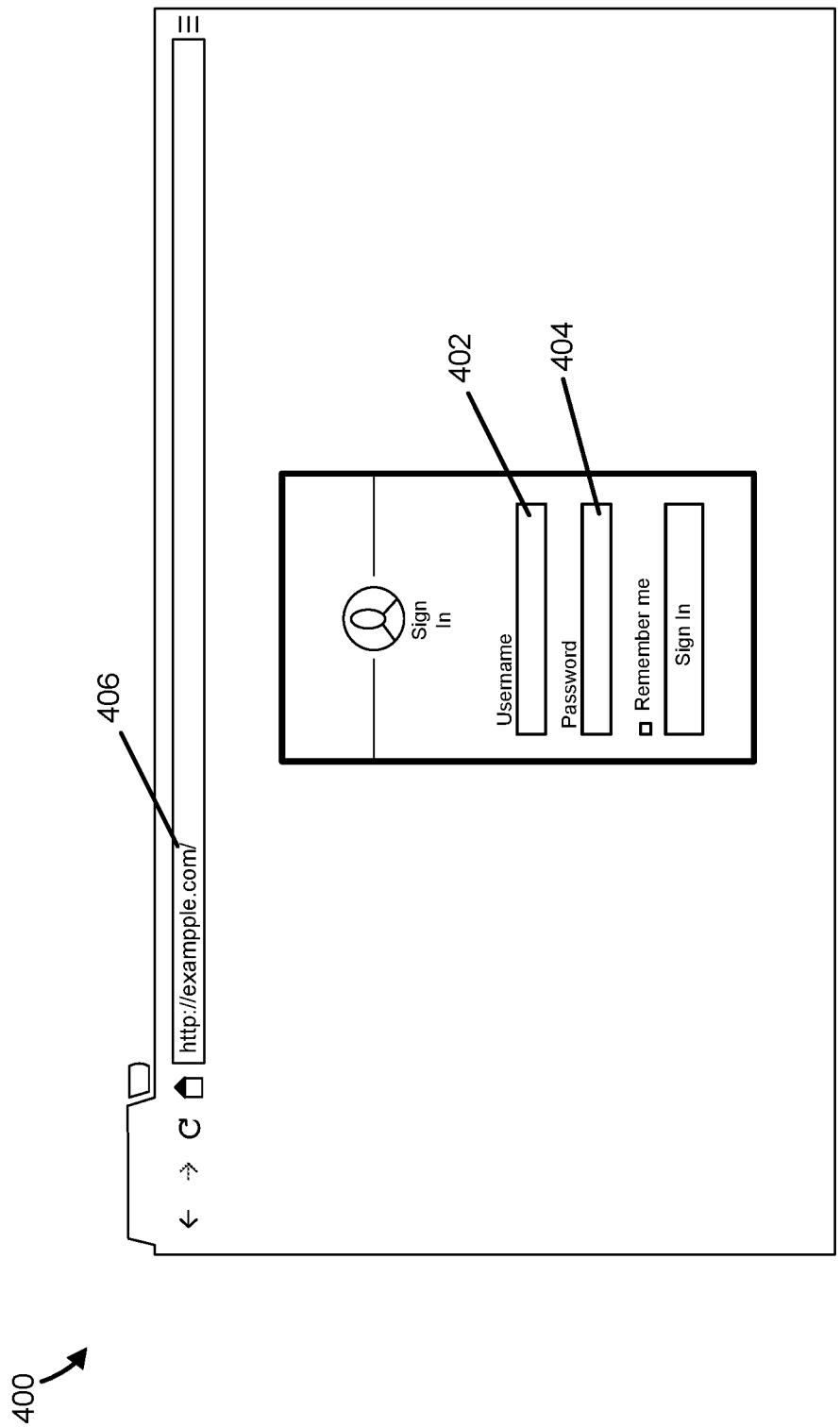
FIG. 4A illustrates an example sign-in page of a phishing website, in accordance with an example of the present disclosure.

FIG. 4A illustrates an example sign-in page 400 of a phishing website, in accordance with an example of the present disclosure. As shown, the sign-in page 400 has username and password input fields 402 and 404. In this example, the sign-in page has been served by a phishing server with URL 406, "http://examppple.com." Note that the URL 406 in this example is similar to a legitimate URL, "http://example.com," so as to deceive users. However, the URL 406 is spelled differently.

In this example, the user may be deceived by the phishing sign-in page 400, which may appear similar to a legitimate sign-in page, such as a sign-in page for the legitimate site, "http://example.com," and may have a similar URL 406. Accordingly, the user may enter valid login credentials into the login fields 402 and 404, as in the example of FIG. 2A above. The phishing site may harvest the user's credentials, as described above. In some examples, the phishing site may also request and/or harvest a one-time password from the user. However, in this example, instead of continuing to pose as the legitimate site, the phishing site may redirect to the legitimate site, as in the example of FIG. 4B.

Figure 4B:
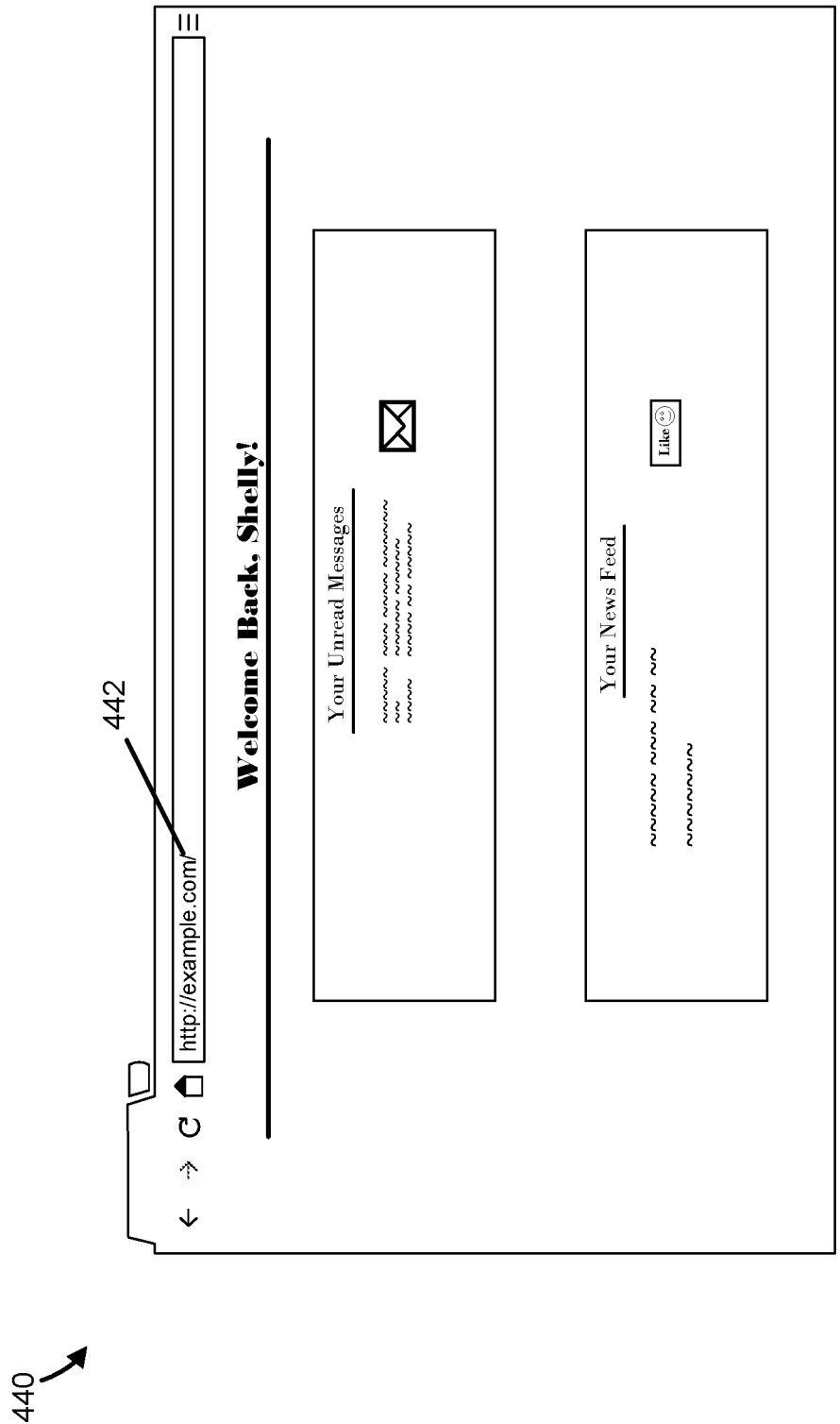
FIG. 4B illustrates an example of redirection from a phishing website to a legitimate website, which can be used to identify phishing, in accordance with an example of the present disclosure.

FIG. 4B illustrates an example of redirection 440 from a phishing website to a legitimate website, which can be used to identify phishing, in accordance with an example of the present disclosure. For example, the phishing site may immediately use the harvested credentials to log into the legitimate site, as described above. Having done so, the phishing site may then redirect the user's browser to the legitimate site 440, as shown. In this example, after the sign-in process, the URL 442 associated with the subsequently loaded page 440 has changed to "http://example.com," spelled correctly. That is, URL 442 may be the URL of the legitimate site that the user had intended to sign into.

Redirecting to the legitimate site 440 may make it even more difficult for the user to detect that phishing has occurred, since the phishing server only hosts the user's experience briefly during the sign-in process of FIG. 4A. However, the disclosed system can detect this redirection. For example, the system can inspect the URL 406 of the sign-in process 400 and the URL 442 of the subsequently loaded page 440 and compare them. In an example, the system can compare the domains of these two sites, and can interpret the change in the domain of the URL 442 as an indication that phishing is occurring.

Figure 4C:
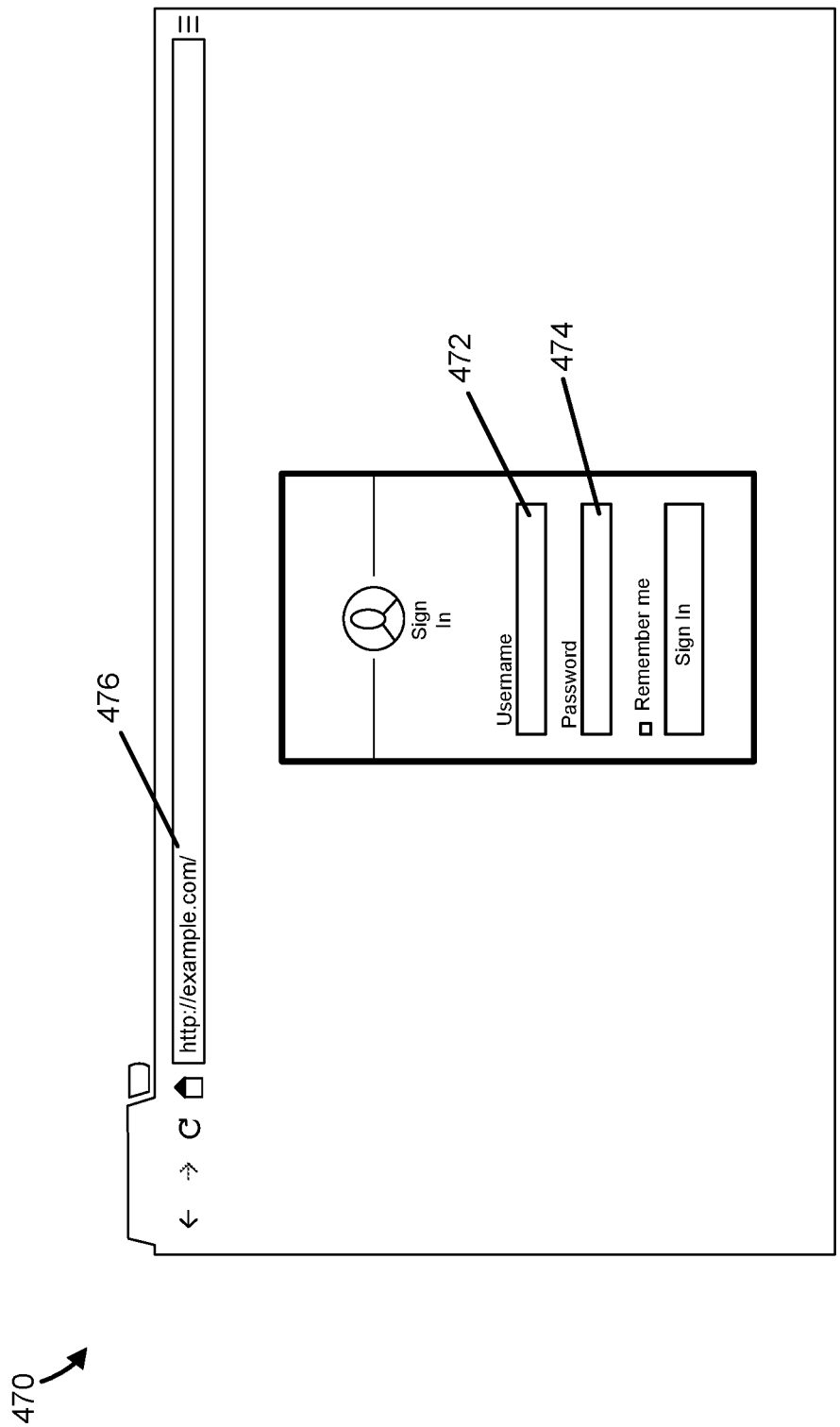
FIG. 4C illustrates an example of redirection from a phishing website to a sign-in page of a legitimate website, which can be used to identify phishing, in accordance with an example of the present disclosure.

FIG. 4C illustrates an example of redirection 470 from a phishing website to a sign-in page of a legitimate website, which can be used to identify phishing, in accordance with an example of the present disclosure. As shown, after receiving the user's credentials, the phishing site can redirect the user's browser to the home page of the legitimate site 470. In this example, the legitimate site serves the legitimate sign-in page 470, with username and password input fields 472 and 474. The legitimate sign-in page appears similar to the phishing sign-in page 400, but has been served by the legitimate website, with URL 476, "http://example.com." Note that the URL 476 is spelled correctly, unlike the URL 406 of the example of FIG. 4A.

In this example, after entering credentials and being redirected to the legitimate sign-in page 470, the user may be deceived into thinking that an error has occurred, for example due to typing the credentials incorrectly or a network disruption. The user may therefore attempt to sign in again, for example re-entering the user's login credentials, this time into the legitimate login fields 472 and 474. In this way, the user may continue to be deceived, even while the phishing site may harvest the user's credentials. In some examples, the user may sign in successfully via the legitimate login page 470, and continue to use the legitimate site, as in the example of FIG. 4B.

Note that, in some examples, the user may have previously signed into the legitimate site without signing out. In such examples, the phishing site's strategy of redirecting to the legitimate site may result in the user's personalized page in the legitimate site loading, as in the example of FIG. 4B, rather than the login page 470. For example, the phishing site may simply request the general URL 476 (e.g., the home page) of the legitimate site, and because the user may remain signed in from a previous visit, the legitimate site may serve the user's page 440, as illustrated in FIG. 4B. Whether the user sees the user's page 440 or the legitimate login page 470 may depend on whether the user remains signed in, but in either case, the system may detect such redirection as an indication of phishing.

In particular, in this example, as in the example of FIG. 4B, the disclosed system can detect the redirection 470. For example, the system can inspect the URL 406 of the original sign-in process 400 while also noting that the page 400 contains sign-in input fields. The system can subsequently also inspect the URL 472 of the legitimate sign-in page 470 and compare the two URLs. In an example, the system may compare the domains of these two URLs, and interpret the change in domain of the URL 472 as an indication of phishing.

In some examples, the system may make use of multiple cues to identify phishing. For example, the system may use a heuristic to weight the importance of several cues, such as the domain change described in the examples of FIGS. 4A-4C, and make a classification of a site as a phishing or a legitimate site. In some examples, the system may use machine learning to weight such cues and/or to classify the site.

Figure 5:
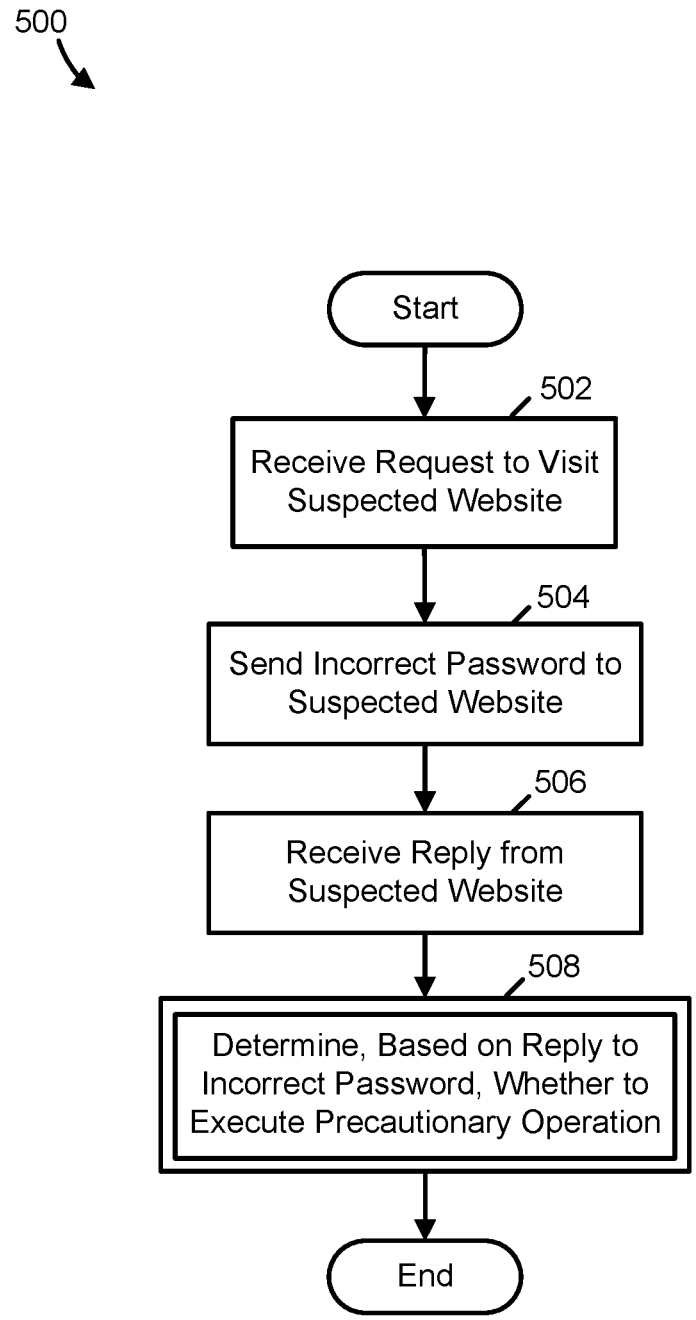
FIG. 5 is a flow diagram of a process for determining safety of a suspected website, in accordance with an example of the present disclosure.

FIG. 5 is a flow diagram illustrating a method 500 for determining safety of a suspected website, in accordance with an example of the present disclosure. The steps of the method 500 may be performed by the workspace application 104 executing on a client device 102, the workspace server 108, or the browser VDA 116, shown in FIG. 1. Alternatively or additionally, some or all of the steps of the method 500 may be performed by one or more other computing devices or client devices, such as computing device 1100 of the example of FIG. 11 below, or may be implemented within a virtualization infrastructure, as described in the example of FIG. 7 below, and are not limited by the present disclosure. The steps of the method 500 may be modified, omitted, and/or performed in other orders, and/or other steps added.

As shown in FIG. 5, the process to determine safety of a suspected website starts with the workspace application, workspace server, or VDA receiving 502 a request to visit the suspicious website or URL. For example, a user may request to visit the suspicious site, for instance by attempting to load the site in a web browser executing within the workspace application, or in a secure browser service. In another example, the user may request to visit the suspicious site by clicking on a link, for example in another webpage or in an email.

In an example, based on a categorization and/or a reputation rating of the site or URL, the link can be redirected to a remote secure browser service. Accordingly, the secure browser can launch. The workspace browser that opens the suspicious link and/or website can present a login page to the user. In an example, at the same time, the system may use a headless browser session to open the suspicious website or URL.

Next, the workspace application, workspace server, or VDA can send 504 an incorrect username and/or password to the suspicious website. As described in the examples of FIGS. 2B-2C and 3A-3B above and FIG. 6 below, the difference in behavior between a legitimate and phishing site in response to incorrect credentials may enable the system to distinguish between them.

For example, the workspace application, workspace server, or VDA can send a randomly generated username and/or password to the suspicious website. In some examples, both the username and password are incorrect, so as to minimize the likelihood of a phishing site harvesting any correct credentials from the encounter.

In another example, the suspicious website may already be aware of a username of the user, for example in the case of a spearphishing or target attack. In such a case, the system may send 504 an incorrect password.

In some examples, the system may open the suspicious website in a headless browser session, or in both a visual browser session and a headless browser session. In an example, the system may use the headless browser session to send 504 the incorrect username and/or password to the suspicious website. The system can identify the login page and/or input field, for example by using HTML "<input>" tags to identify the input fields, "type=password" tags, label names such as "username" and/or "password" on input fields, login button, etc.

The system can initiate a login using an incorrect, random, or fake username and/or password. The system can enter the incorrect credentials via JavaScript, and then perform a "login" and/or "sign in" button action, or a post action on the form. After sending the incorrect username and/or password to the suspicious website, the system may monitor the page, for example using the headless browser session, to detect failure or success.

Next, the workspace application, workspace server, or VDA can receive 506 a reply from the suspicious website. In an example, the system can use the headless browser session to load and evaluate the reply before determining whether to allow a user to visit the suspicious website with a visual browser instance. For example, the reply can include an affirmative reply, such as the reply in the examples of FIGS. 2C and 3B above, or an error reply, such as in FIGS. 2B and 3A. In some examples, the reply may be directed to a different domain, for example from a phishing domain to a legitimate domain, as in FIGS. 4A-4C.

Next, the workspace application, workspace server, or VDA can determine 508, based on the reply to the incorrect password, whether to proceed with the request or execute a precautionary operation. For example, after loading the reply in a headless browser session, the system may determine whether to proceed with the user's request to visit the suspicious site in a visual browser instance.

In an example, in the case of an affirmative or successful reply from the suspicious site, the system may determine to execute a precautionary operation, such as terminating the request. This is because an affirmative or successful reply to an incorrect login may indicate the suspicious site is a phishing site, as described in the examples of FIGS. 2B-2C and 3A-3B above. In some examples, the system may terminate the visual instance of the browser and/or may render a notification for the user, such as via a dialog. In some examples, the system may add the site to a blacklist of unsafe or phishing sites, and may thereafter forbid visiting the site. In some examples, the system may share such a blacklist across user sessions or workspace sessions, such as by updating a repository on the workspace server or in the cloud, and/or may update the shared blacklist periodically by repeating the method 500.

In the case of an unsuccessful reply or an error message, the system may determine to proceed with the request. This is because an unsuccessful reply or an error message may indicate the suspicious site is not a phishing site, as described above. In some examples, the system may add the site to a whitelist of safe or legitimate sites, and may thereafter allow visiting the site. In some examples, the system may share such a whitelist across user sessions or workspace sessions, such as by updating a repository on the workspace server or in the cloud, and/or may update the shared whitelist periodically by repeating the method 500.

Additional details of the determination 508 of whether to proceed with a request to visit a suspicious site or execute a precautionary operation are described in the example of FIG. 6 below.

The method 500 may then end.

Figure 6:
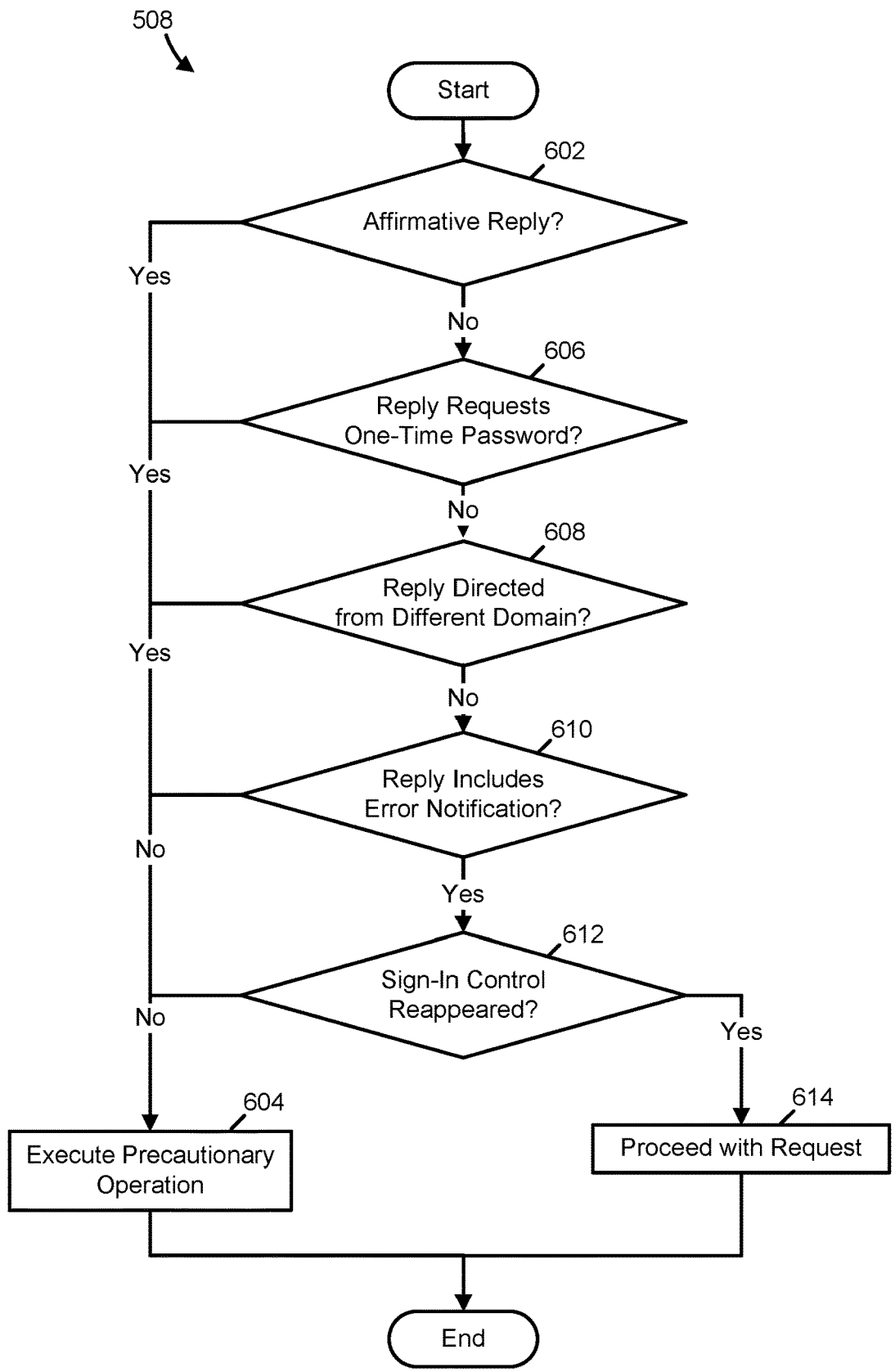
FIG. 6 is a flow diagram of a process for determining whether to proceed with a request to visit a suspected website or execute a precautionary operation, in accordance with an example of the present disclosure.

FIG. 6 is a flow diagram of a process 508 for determining whether to proceed with a request to visit a suspected website or execute a precautionary operation, in accordance with an example of the present disclosure. In this example, the process 508 may provide additional details of step 508 of the process 500 for determining safety of a suspected website in FIG. 5. In various examples, the process 508 may be implemented by the workspace application 104 executing on a client device 102, the workspace server 108, or the browser VDA 116, shown in FIG. 1. Alternatively or additionally, some or all of the steps of the method 508 may be performed by one or more other computing devices or client devices, such as computing device 1100 of the example of FIG. 11 below, or may be implemented within a virtualization infrastructure, as described in the example of FIG. 7 below, and are not limited by the present disclosure.

In this example, the method 508 is shown following a prescribed number and ordering of steps. However, a person skilled in the art will appreciate that many variations are possible in light of this disclosure. The steps of the method 508 may be modified, omitted, and/or performed in other orders, and/or other steps added. In some examples, the system may make use of multiple cues simultaneously in order to identify phishing. For example, the system may use a heuristic to weight the importance of several of the cues shown here, such as the steps of the method 508, in order to make a classification of the site as a phishing or legitimate site. In some examples, the system may use machine learning to weight such cues and/or to classify the site.

As shown in FIG. 6, the process to determine whether to proceed with a request to visit a suspected website or execute a precautionary operation starts with the workspace application, workspace server, or VDA determining 602 whether a reply from the suspicious website to an incorrect login is affirmative.

Responsive to the reply being affirmative, the workspace application, workspace server, or VDA can continue to execute 604 a precautionary operation. In various examples, executing 604 the precautionary operation can include abandoning the request to visit the suspicious website, terminating the visual instance of the browser, rendering an alert or warning notification for the user (e.g., via a dialog, in the visual browser instance, or via another application, which may execute on the same device, a virtual machine, or a different device), adding the site to a blacklist of unsafe or phishing sites, rendering a notification (for example, via an administrative interface, to a security operations center, and/or to an information technology security administrator), and/or thereafter forbidding visiting the site. The method 508 may then end.

Next, responsive to the reply not being affirmative, the workspace application, workspace server, or VDA can continue to determine 606 whether the reply requests a one-time password. For example, the workspace application, workspace server, or VDA can determine 606 whether the reply includes a one-time password field, for example by using HTML "<input>" tags to identify the input fields, "type=password" tags, "type=text" tags, "type=input" tags, label names on the input fields, and the like, as described in the example of FIG. 3B above.

Responsive to the reply from the suspicious site requesting a one-time password, the workspace application, workspace server, or VDA can continue to execute 604 a precautionary operation. This is because a request for a one-time password in reply to an incorrect login may indicate the suspicious site is a phishing site seeking to harvest the one-time password and/or other login credentials, as described in the examples of FIGS. 2C and 3B above.

Next, responsive to the reply not requesting a one-time password, the workspace application, workspace server, or VDA can continue to determine 608 whether the reply is redirected to a different domain than the suspicious website or URL. For example, the system can obtain the URL of the reply directly from the browser and/or from the browser address bar, and can obtain the domain from the URL.

Responsive to the reply being redirected to a different domain, the workspace application, workspace server, or VDA can continue to execute 604 a precautionary operation. This is because being directed from a different domain may indicate the suspicious site is a phishing site, as described in the examples of FIGS. 4A-4C above.

Next, responsive to the reply not being directed from a different domain, the workspace application, workspace server, or VDA can continue to determine 610 whether the reply includes an error notification.

Responsive to the reply not including an error notification, the workspace application, workspace server, or VDA can continue to execute 604 a precautionary operation. This is because not replying to an incorrect login with an error notification may indicate the suspicious site is a phishing site, as described in the examples of FIGS. 2B-2C and 3A-3B above.

Next, responsive to the reply including an error notification, the workspace application, workspace server, or VDA can continue to determine 612 whether a sign in control has reappeared. For example, the workspace application, workspace server, or VDA can determine 612 whether the login page and/or input field has reappeared, for example by using HTML "<input>" tags to identify the input fields, "type=password" tags, label names such as "username" and/or "password" on input fields, login button, etc. Responsive to the reply not including the sign in control, the workspace application, workspace server, or VDA can continue to execute 604 a precautionary operation.

Next, responsive to the sign in control having reappeared, the workspace application, workspace server, or VDA can proceed 614 with the request. For example, the system may add the site to a whitelist of safe or legitimate sites, share such a whitelist across user sessions or workspace sessions, and/or thereafter allow visiting the site.

The method 508 can then end.

Computer System Configured to Evaluate Safety of a Suspected Website

Figure 7:
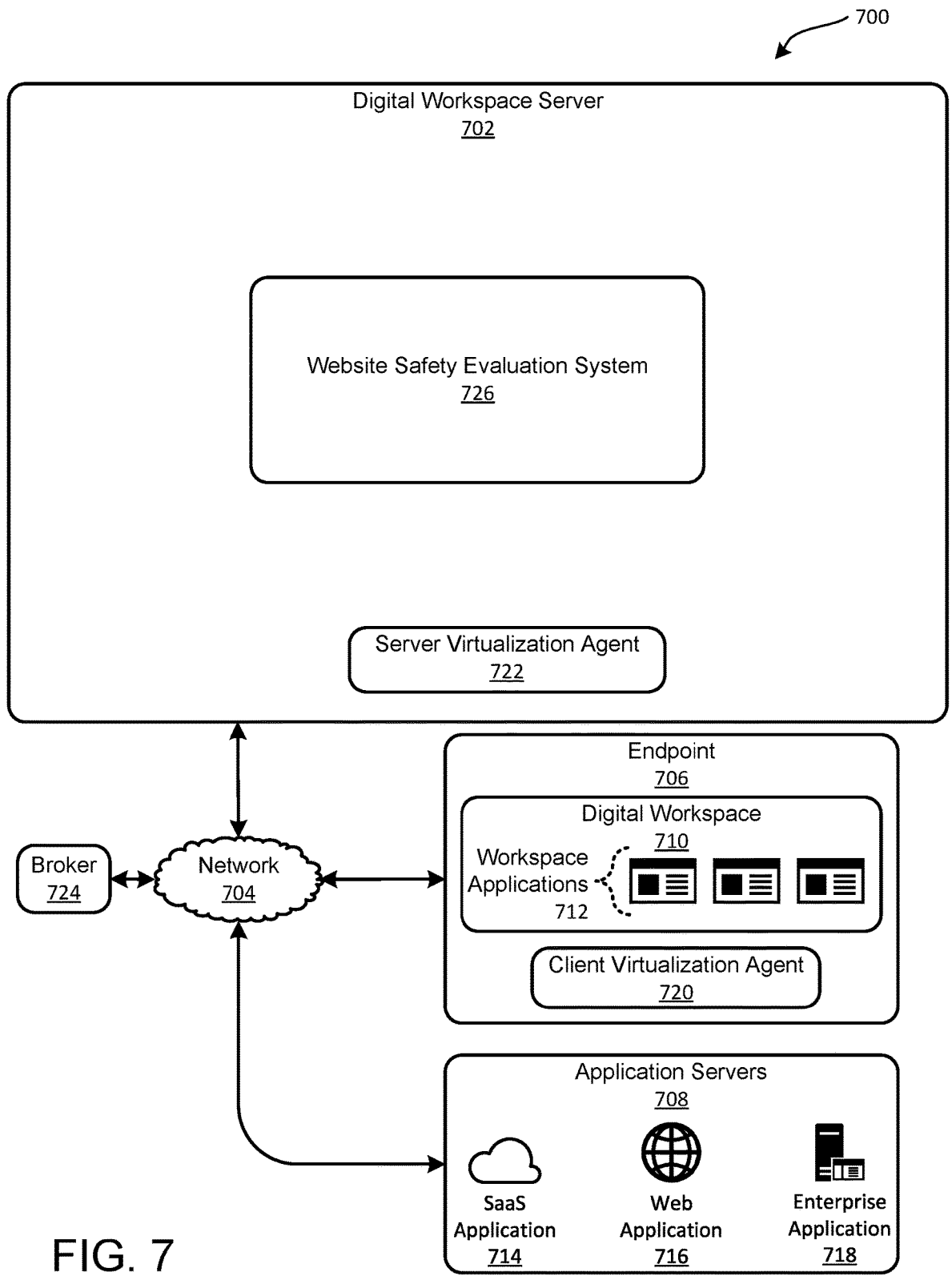
FIG. 7 is a block diagram of an example system for determining safety of a suspected website, in accordance with an example of the present disclosure.

FIG. 7 is a block diagram of an example system 700 for evaluating safety of a suspected website, in accordance with an example of the present disclosure. The system 700 includes a digital workspace server 702 that is capable of carrying out the methods disclosed herein. The user's association with the endpoint 706 may exist by virtue of, for example, the user being logged into or authenticated to the endpoint 706. While only one endpoint 706 and three example application servers 708 are illustrated in FIG. 7 for clarity, it will be appreciated that, in general, the system 700 is capable of hosting connections between an arbitrary number of endpoints and an arbitrary number of application servers. The digital workspace server 702, the endpoint 706, and the application servers 708 communicate with each other via a network 704. The network 704 may be a public network (such as the Internet) or a private network (such as a corporate intranet or other network with restricted access). Other examples may have fewer or more communication paths, networks, subcomponents, and/or resources depending on the granularity of a particular implementation. For example, in some implementations at least a portion of the application functionality is provided by one or more applications hosted locally at an endpoint. Thus references to the application servers 708 should be understood as encompassing applications that are locally hosted at one or more endpoints. It should therefore be appreciated that the examples described and illustrated herein are not intended to be limited to the provision or exclusion of any particular services and/or resources.

The digital workspace server 702 is configured to host a website safety evaluation system 726, which can implement the disclosed methods for determining safety of a suspected website, and the server virtualization agent 722. The digital workspace server 702 may correspond to the workspace server 112 of FIG. 1. The digital workspace server 702 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain examples. As illustrated in FIG. 7, the digital workspace server 702 includes one or more software programs configured to implement certain of the functionalities disclosed herein as well as hardware capable of enabling such implementation.

As noted above, in certain examples the endpoint 706 can be a computing device that is used by the user, and may correspond to the client device 102 of FIG. 1. Examples of the endpoint 706 include but are not limited to, a desktop computer, a laptop computer, a tablet computer, and a smartphone. The digital workspace server 702 and its components are configured to interact with a plurality of endpoints. In an example, the user interacts with a plurality of workspace applications 712 that are accessible through a digital workspace 710, which can serve as a workspace application 104 discussed above with reference to FIG. 1. The user's interactions with the workspace applications 712 and/or the application servers 708 may be tracked, monitored, and analyzed by the workspace service. Any microapps can be made available to the user through the digital workspace 710, thereby allowing the user to view information and perform actions without launching (or switching context to) the underlying workspace applications 712. The workspace applications 712 can be provided by the application servers 708 and/or can be provided locally at the endpoint 706. For instance, the example workspace applications 712 include a SaaS application 714, a web application 716, and an enterprise application 718, although any other suitable exiting or subsequently developed applications can be used as well, including proprietary applications and desktop applications. To enable the endpoint 706 to participate in a virtualization infrastructure facilitated by the broker computer 724 and involving the server virtualization agent 722 as discussed herein, the endpoint 706 also hosts the client virtualization agent 720.

The broker computer 724 is configured to act as an intermediary between the client virtualization agent 720 and the server virtualization agent 722 within the virtualization infrastructure. In some examples, the broker computer 724 registers virtual resources offered by server virtualization agents, such as the server virtualization agent 722. In these examples, the broker computer 724 is also configured to receive requests for virtual resources from client virtualization agents, such as the client virtualization agent 720, and to establish virtual computing sessions involving the client virtualization agent 720 and the server virtualization agent 722.

Figure 8:
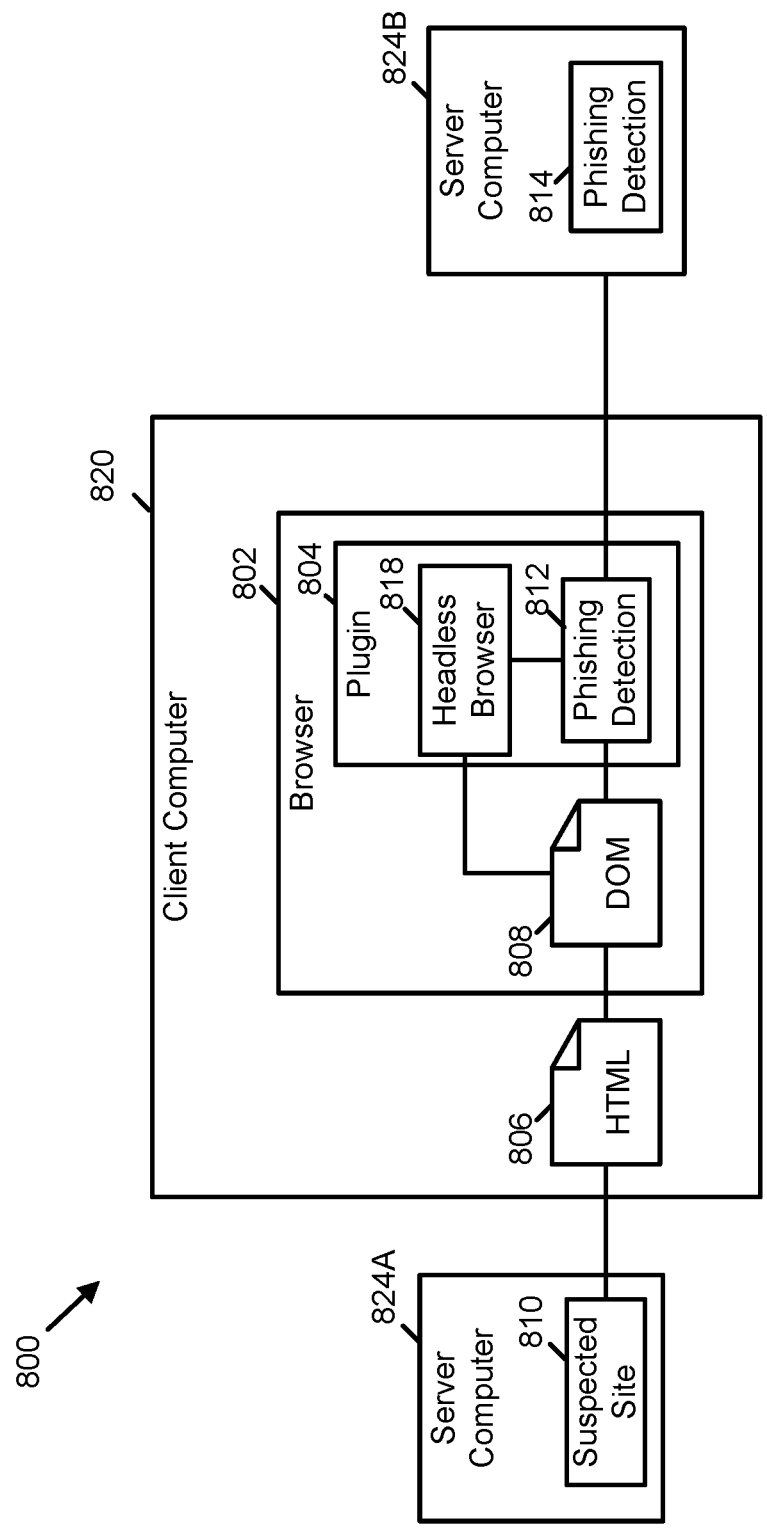
FIG. 8 is a block diagram of an example system for determining safety of a suspected website as implemented by a specific configuration of computing devices, in accordance with an example of the present disclosure.

FIG. 8 illustrates an example system 800 for determining safety of a suspected website (e.g., the system 100 of FIG. 1) configured for operation within a distributed computing platform (e.g. a network environment). As shown in FIG. 8, the configuration 800 includes a client computer 820 and the server computers 824A and 824B. Within the configuration 800, the computer systems 820, 824A, and 824B are communicatively coupled to one another and exchange data via a network.

As shown in FIG. 8, the server 824A is configured to host the suspected site 810. The client 820 is configured to host a browser 802. The browser 802 includes a plugin 804 that can include a headless browser 818. In various examples, the server 824B may be configured to host a phishing detection service 814 for determining safety of the suspected site 810, and/or the browser plugin 804 can include a phishing detection system 812 for determining safety of the suspected site 810. Some of the components illustrated in FIG. 8 are described above with reference to FIG. 1. However, the descriptions of some of these components may be augmented below.

As illustrated in FIG. 8, the server 824 is configured to serve the suspected site 810 to the browser 802. As part of this service, the server 824 is configured to transmit the HTML 806 of FIG. 1 to the client 820 using, for example, HyperText Transfer Protocol (HTTP), and the browser 802 is configured to load the HTML 806 into a DOM 808.

In some examples of the configuration 800, the browser 802 is configured to support DOM event notifications in order to identify error notifications in response to incorrect user credentials, and the like, as described above. In these examples, the phishing detection system 812 may subscribe to these notifications and receive and process the notifications to identify error notifications and the like. In other examples of the configuration 800, the browser 802 does not support DOM event notifications. In these examples, the phishing detection system 812 is configured to poll the browser 802 for a copy of the DOM 808 and process the DOM to identify error notifications and the like. For instance, in at least one example, to receive a consistent stream of copies to analyze, the phishing detection system 812 is configured to transmit polling requests to the browser 802 on a periodic basis, such as between HTTP requests/responses. Regardless of the technique used to examine contents of the suspected site's response, the components of the system illustrated in FIG. 8 are configured to interoperate to determine safety of a suspected site, as described above.

The configuration 800 is but one example of many potential configurations that can be used to implement the disclosed system. For instance, in some examples, the phishing detection system 812, rather than the phishing detection service 814, is configured to instruct the browser 802. In some examples, the browser 802 is configured to interoperate with the phishing detection service 814 to drive phishing behavior detection and precautionary operations. In other examples, the phishing detection system 812 can be configured to communicate instructions to other processes hosted by the client 820. In other examples, the headless browser 818 is configured to interoperate with the browser 802 or other process hosted by the client 820. In this example, the headless browser session 120 executes within the client device 820, but in various examples, it may execute within a VDA, as in FIG. 1, a virtual machine, as in the example of FIG. 10 below, or within a separate computing device. As such, the examples disclosed herein are not limited to the particular configuration 800 and other configurations are considered to fall within the scope of this disclosure.

Figure 9:
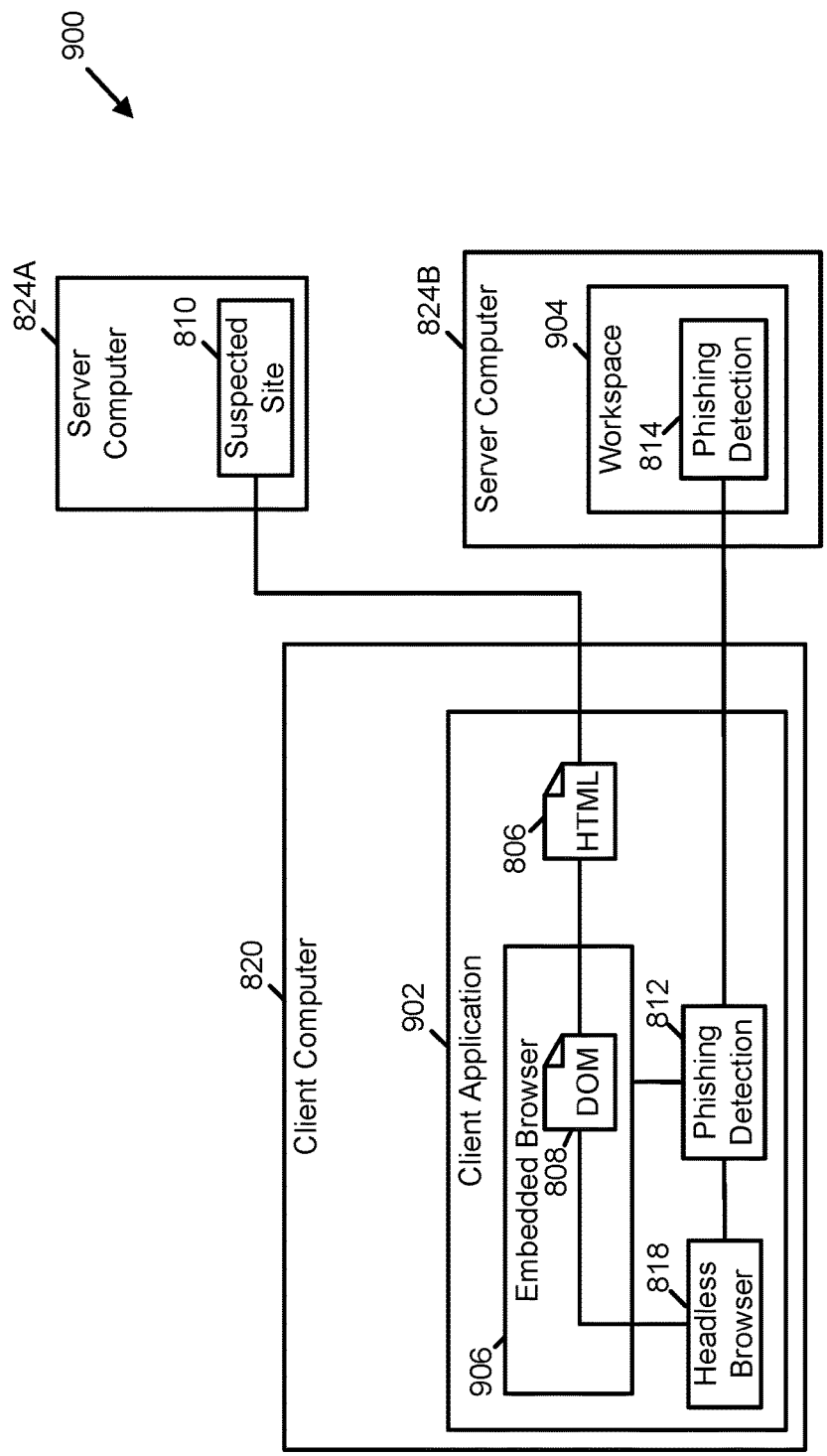
FIG. 9 is a block diagram of block diagram of an example system for determining safety of a suspected website as implemented by a specific configuration of computing devices, in accordance with an example of the present disclosure.

FIG. 9 illustrates an example system 900 for determining safety of a suspected website (e.g., the system 100 of FIG. 1) configured for operation within a distributed computing platform (e.g. a network environment). As shown in FIG. 9, the configuration 900 includes the client computer 820 and the server computers 824A and 824B of FIG. 8. Within the configuration 900, the computer systems 820, 824A, and 824B are communicatively coupled to one another and exchange data via a network.

As shown in FIG. 9, the server 824A is configured to host the suspected site 810 of FIG. 8. The client 820 is configured to host a client application 902. The client application 902 includes an embedded browser 906, and the headless browser 818 and phishing detection system 812 of FIG. 8. The embedded browser 906 can be implemented, for example, using the Chromium Embedded Framework. The server 824B is configured to host a virtualization workspace service 904. The workspace service 904 includes, as a service endpoint, the phishing detection service 814 of FIG. 8. Some of the components illustrated in FIG. 9 are described above with reference to FIGS. 1 and 8. However, the descriptions of some of these components may be augmented below.

As illustrated in FIG. 9, the server 824A is configured to serve the suspected site 810 to the client application 902. As part of this service, the server 824A is configured to transmit the HTML 806 to the client application 902. The client application 902 is configured to provide the HTML 806 to the embedded browser 906 and the embedded browser 906 is configured to load the HTML 806 into a DOM 808.

In some examples of the configuration 900, the client application 902 is configured to connect to the workspace service 904 during initialization and to update the phishing detection system 812. In these examples, the client application 902 is configured to provide the suspected site 810 to an end user via the embedded browser 906. The phishing detection system 812 is configured to detect phishing behavior by the suspected site 810 during its provision by the client application 902, and may interoperate with the phishing detection service 814 to identify behavior associated with phishing, for example returning a successful response to incorrect credentials, as described above. To provide instructions on whether to proceed with loading a site or executing precautionary actions, the phishing detection system 812 is configured to communicate with the headless browser 818. Likewise, as the headless browser 818 has access to the DOM 808 in this configuration, the headless browser 818 may send the DOM 808, or information describing the DOM 808, to the phishing detection system 812, in order to identify error notifications in response to incorrect user credentials, and the like, as described above.

The configuration 900 is but one example of many potential configurations that can be used to implement the system 100. For instance, in some examples, the phishing detection system 812, rather than the phishing detection service 814, is configured to instruct the embedded browser 906 or the client application 902. In these examples, the embedded browser 906 or the client application 902 is configured to interoperate with the phishing detection service 814 to drive phishing behavior detection and precautionary operations in conjunction with the headless browser 818. In other examples, the embedded browser 906 includes and/or is extended by the phishing detection system 812. In this example, the headless browser session 120 executes within the client device 820, but in various examples, it may execute within a VDA, as in FIG. 1, a virtual machine, as in the example of FIG. 10 below, or within a separate computing device. As such, the examples disclosed herein are not limited to the particular configuration 900 and other configurations are considered to fall within the scope of this disclosure.

Figure 10:
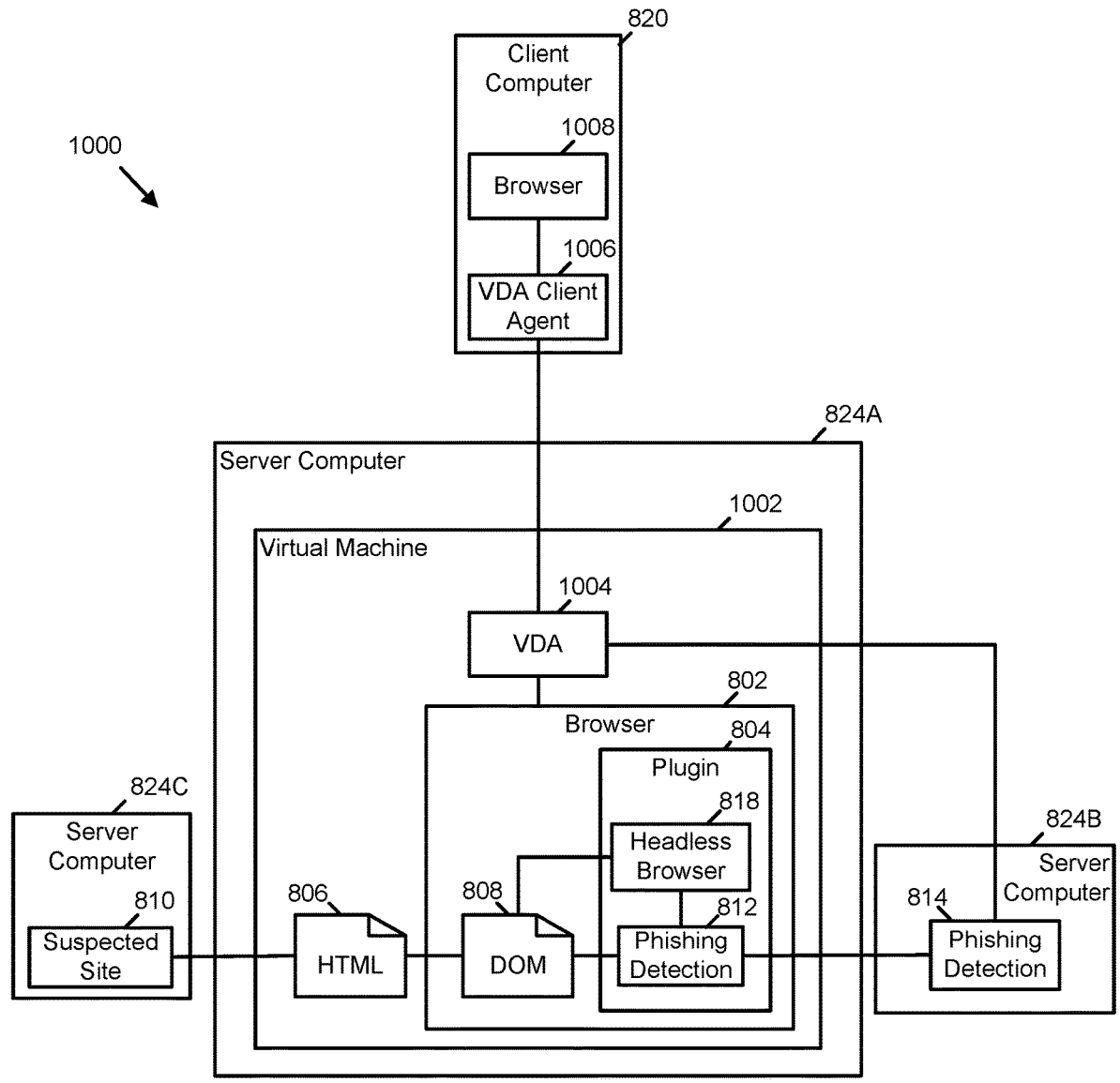
FIG. 10 is a block diagram of block diagram of an example system for determining safety of a suspected website as implemented by a specific configuration of computing devices, in accordance with an example of the present disclosure.

FIG. 10 illustrates an example system 1000 for determining safety of a suspected website (e.g., the system 100 of FIG. 1) configured for operation within a distributed computing platform (e.g., a network environment). As shown in FIG. 10, the configuration 1000 includes the client computer 820 and the server computers 824A-824C of FIG. 8. Within the configuration 1000, the computer systems 820 and 824A-824C are communicatively coupled to one another and exchange data via a network.

As shown in FIG. 10, the server 824C is configured to host the suspected site 810 of FIG. 8. The client 820 is configured to host a browser 1008 and a VDA client agent 1006. The server 824A is configured to host a virtual machine 1002. The virtual machine 1002 is configured to host a VDA 1004 and the browser 802 of FIG. 8. The VDA 1004 and the VDA client agent 1006 are configured to establish a virtualization infrastructure between the client 820 and the server 824A. The server 824B is configured to host the phishing detection service 814 of FIG. 8. Some of the components illustrated in FIG. 10 are described above with reference to FIGS. 1, 8, and 9. However, the descriptions of some of these components may be augmented below.

As illustrated in FIG. 10, the server 824C is configured to serve the suspected site 810 to the browser 802. As part of this service, the server 824C is configured to transmit the HTML 806 to the virtual machine 1002. The virtual machine 1002 is configured to provide the HTML 806 to the browser 802, and the browser 802 is configured to load the HTML 806 into the DOM 808 of FIG. 8. The components of the system for determining safety of a suspected website illustrated in FIG. 10 are configured to interoperate with the browser 802 to determine safety of a suspected site, as described above. The VDA 1004 and the VDA client agent 1006 are configured to interoperate to provide the UI of the virtual machine 1002 to an end user via the browser 1008, thereby providing the end user with access to the suspected site 810. In some examples, the VDA 1004 and the VDA client agent 1006 are further configured to update the phishing detection system 812 in the background during initialization or on-going operation of the virtual machine 1002.

The configuration 1000 is but one example of many potential configurations that can be used to implement the system 100. For instance, in some examples, the phishing detection system 812, rather than the phishing detection service 814, is configured to instruct the VDA 1004. In these examples, the VDA 1004 is configured to interoperate with the phishing detection service 814 to drive phishing behavior detection and precautionary operations in conjunction with the headless browser 818. More specifically, in some examples, the VDA 1004 can be configured to host the headless browser 818 and/or the phishing detection system 812. In this example, the headless browser session 120 executes within the virtual machine 1002, but in various examples, it may execute within a VDA, as in FIG. 1, a client device, as in the examples of FIGS. 8-9, or within a separate computing device. As such, the examples disclosed herein are not limited to the particular configuration 1000 and other configurations are considered to fall within the scope of this disclosure.

Computing Device

Figure 11:
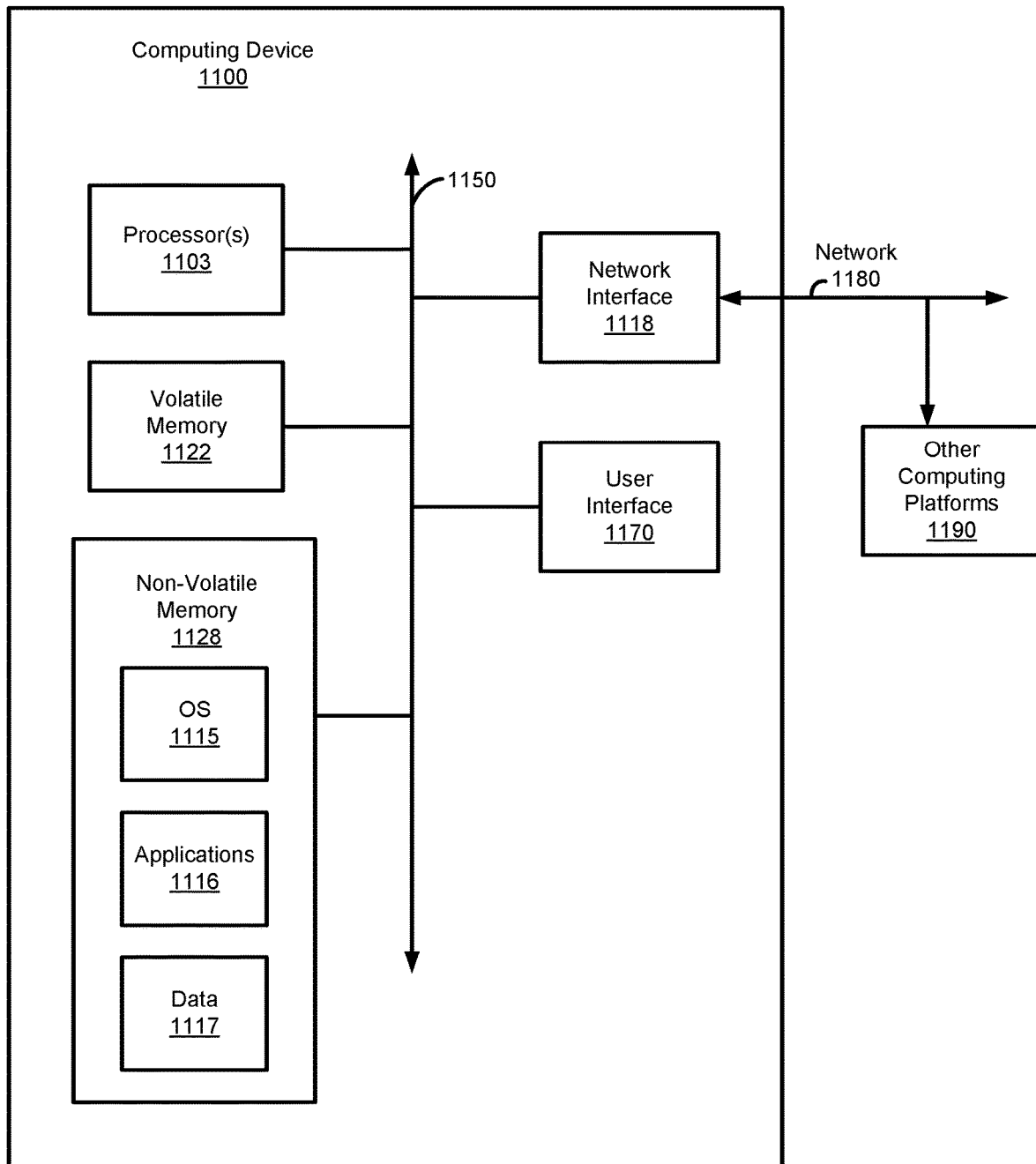
FIG. 11 is a block diagram of a computing device configured to implement various systems and processes in accordance with examples disclosed herein.

FIG. 11 is a block diagram of a computing device 1100 configured to implement various systems and processes in accordance with examples disclosed herein.

The computing device 1100 includes one or more processor(s) 1103, volatile memory 1122 (e.g., random access memory (RAM)), non-volatile memory 1128, a user interface (UI) 1170, one or more network or communication interfaces 1118, and a communications bus 1150. The computing device 1100 may also be referred to as a client device, computing device, endpoint device, computer, or a computer system.

The non-volatile (non-transitory) memory 1128 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1170 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 1128 stores an OS 1115, one or more applications or programs 1116, and data 1117. The OS 1115 and the application 1116 include sequences of instructions that are encoded for execution by processor(s) 1103. Execution of these instructions results in manipulated data. Prior to their execution, the instructions can be copied to the volatile memory 1122. In some examples, the volatile memory 1122 can include one or more types of RAM and/or a cache memory that can offer a faster response time than a main memory. Data can be entered through the user interface 1170 or received from the other I/O device(s), such as the network interface 1118. The various elements of the device 1100 described above can communicate with one another via the communications bus 1150.

The illustrated computing device 1100 is shown merely as an example client device or server and can be implemented within any computing or processing environment with any type of physical or virtual machine or set of physical and virtual machines that can have suitable hardware and/or software capable of operating as described herein.

The processor(s) 1103 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 1103 can be analog, digital or mixed. In some examples, the processor(s) 1103 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

The network interfaces 1118 can include one or more interfaces to enable the computing device 1100 to access a computer network 1180 such as a Local Area Network (LAN), a Wide Area Network (WAN), a Personal Area Network (PAN), or the Internet through a variety of wired and/or wireless connections, including cellular connections and Bluetooth connections. In some examples, the network 1180 may allow for communication with other computing devices 1190, to enable distributed computing. The network 1180 can include, for example, one or more private and/or public networks over which computing devices can exchange data.

In described examples, the computing device 1100 can execute an application on behalf of a user of a client device. For example, the computing device 1100 can execute one or more virtual machines managed by a hypervisor. Each virtual machine can provide an execution session within which applications execute on behalf of a user or a client device, such as a hosted desktop session. The computing device 1100 can also execute a terminal services session to provide a hosted desktop environment. The computing device 1100 can provide access to a remote computing environment including one or more applications, one or more desktop applications, and one or more desktop sessions in which one or more applications can execute.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system configured to determine safety of a suspected website, the computer system comprising:
   at least one processor; and
   one or more memory storing instructions that, when executed by the at least one processor, configure the computer system to:
      receive, via user interaction with a first browser session, a request to visit the suspected website;
      identify, based on the request, a rating of the suspected website;
      cause, based on the rating, the suspected website to open in a second browser session, wherein the second browser session is separate from the first browser session;

send, via the second browser session, an incorrect login credential to the suspected website;
receive, via the second browser session, a reply from the suspected website; and
determine, based on the reply to from the suspected website, a precautionary operation;
execute the precautionary operation.

2. The computer system of claim 1, wherein the precautionary operation further causes the system to:
proceed, based on the reply from the suspected website indicating an error notification, with the request.

3. The computer system of claim 2, wherein the precautionary operation further causes the system to:
identify the error notification based on one or more of:
a Document Object Model (DOM) tag;
a re-appearance of a sign-in control; or
an Application Programming Interface (API) call.

4. The computer system of claim 1, wherein the precautionary operation further causes the system to:
determine, based on the reply from the suspected website, the reply indicates a phishing website; and
abandon, based on the response indicating a phishing website, the request.

5. The computer system of claim 4, wherein the reply from the suspected website comprises a prompt or input field for a one-time password.

6. The computer system of claim 1, wherein the precautionary operation causes the system to perform one or more of:
render, via a user interface, an alert; or
abandon the request.

7. The computer system of claim 1, wherein the precautionary operation further causes the system to abandon the request responsive to the reply being redirected to a domain other than a domain of the suspected website.

8. The computer system of claim 1, wherein the reply from the suspected website further causes the system to:
load the reply in a headless browser session.

9. The computer system of claim 8, wherein the precautionary operation causes the computer system to:
proceed with the request via a visual browser instance.

10. The computer system of claim 1, wherein the incorrect login credential comprises a randomly generated password and/or username.

11. The computer system of claim 1, wherein the memory storing instructions that, when executed by the one or more processors, further configure the system to:
receive the request;
send the incorrect password;
receive the reply; and
execute the precautionary operation through one or more of:
a virtual machine,
a Virtual Delivery Agent (VDA),
a browser,
a secure browser,
a browser plugin, or
a headless browser.

12. The computer system of claim 1, wherein the memory storing instructions that, when executed by the one or more processors, further configure the system to:
send the incorrect password;
receive the reply; and
execute the precautionary operation through one or more of:
a client application,
a browser,
an embedded browser,
a secure browser,
a browser plugin, or
a headless browser.

13. A method of determining safety of a suspected website, the method comprising:
receiving, via a first browser session, a request to visit the suspected website;
identifying, based on the request, a rating of the suspected website;
causing, based on the rating, the suspected website to open in a second browser session, wherein the second browser session is separate from the first browser session;
sending, via the second browser session, an incorrect login credential to the suspected website;
receiving, via the second browser session, a reply from the suspected website; and
determining, based on the reply from the suspected website, a precautionary operation;
executing the precautionary operation.

14. The method of claim 13, wherein determining the precautionary operation comprises:
determining whether the reply from the suspected website includes an error notification based on one or more of:
a Document Object Model (DOM) tag;
a re-appearance of a sign-in control; or
an Application Programming Interface (API); and
responsive to determining that the reply includes the error notification, proceeding with the request.

15. The method of claim 13, wherein determining the precautionary operation comprises abandoning the request responsive to one or more of the reply:
being affirmative;
including a prompt or input field for a one-time password; or
being redirected to a domain other than a domain of the suspected website.

16. The method of claim 13, wherein the reply from the suspected website is loaded in a headless browser session and/or within a sandbox environment.

17. The method of claim 16, wherein loading the reply in the headless browser session and/or within the sandbox environment comprises loading, by a separate device or virtual machine, the reply in the headless browser session and/or within the sandbox environment.

18. The method of claim 13, further comprising:
obtaining a link to the suspected website prior to receiving the request to visit the suspected website;
wherein sending the incorrect login credential comprises, in response to obtaining the link and prior to receiving the request to visit the suspected website, sending an incorrect password to the suspected website within a sandbox environment; and
wherein receiving the reply from the suspected website comprises loading the reply within the sandbox environment and prior to receiving the request to visit the suspected website.

19. The method of claim 13, wherein sending an incorrect login credential to the suspected website comprises sending a randomly generated password and/or username to the suspected website.

20. One or more non-transitory computer readable medium storing executable sequences of instructions to determine safety of a suspected website, the sequences of instructions comprising instructions to:

receive, via user interaction with a first browser session, a request to visit the suspected website;
identify, based on the request, a rating of the suspected website;
cause, based on the rating, the suspected website to open in a second browser session, wherein the second browser session is separate from the first browser session;
send, via the second browser session, an incorrect login credential to the suspected website;
receive, via the second browser session, a reply from the suspected website; and
determine, based on the reply from the suspected website, a precautionary operation;
execute the precautionary operation.

\* \* \* \* \*